US 12,142,294 B2

(12) United States Patent
Namba et al.

(10) Patent No.: US 12,142,294 B2
(45) Date of Patent: Nov. 12, 2024

(54) SIGNAL PROCESSING APPARATUS, METHOD, AND PROGRAM TO DETECT A TIME INTERVAL CONTAINING SOUND BASED ON A DISTANCE BETWEEN TWO MOBILE BODIES

(71) Applicant: SONY GROUP CORPORATION, Tokyo (JP)

(72) Inventors: Ryuichi Namba, Tokyo (JP); Makoto Akune, Tokyo (JP); Yoshiaki Oikawa, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 116 days.

(21) Appl. No.: 17/641,928

(22) PCT Filed: Sep. 4, 2020

(86) PCT No.: PCT/JP2020/033612
§ 371 (c)(1),
(2) Date: Mar. 10, 2022

(87) PCT Pub. No.: WO2021/054152
PCT Pub. Date: Mar. 25, 2021

(65) Prior Publication Data
US 2022/0335967 A1  Oct. 20, 2022

(30) Foreign Application Priority Data
Sep. 18, 2019  (JP) .................. 2019-169093

(51) Int. Cl.
G10L 25/93    (2013.01)
G01S 19/01    (2010.01)
G10L 15/02    (2006.01)
G10L 21/0208  (2013.01)

(52) U.S. Cl.
CPC .............. *G10L 25/93* (2013.01); *G01S 19/01* (2013.01); *G10L 15/02* (2013.01); *G10L 21/0208* (2013.01)

(58) Field of Classification Search
CPC ...... G10L 15/26; G10L 21/0208; G10L 15/02
See application file for complete search history.

(56) References Cited

U.S. PATENT DOCUMENTS 11,031,013 B1 * 6/2021 Myers ..................... G10L 15/02

FOREIGN PATENT DOCUMENTS

| EP | 2 637 167 A1 | * 6/2013 | ......... G10L 21/0208 |
| JP | 2014-153663 A | 8/2014 | |
| JP | 2017-205213 A | 11/2017 | |
| WO | 2014/125791 A1 | 8/2014 | |

OTHER PUBLICATIONS

International Search Report and Written Opinion of PCT Application No. PCT/JP2020/033612, issued on Nov. 24, 2020, 08 pages of ISRWO.

* cited by examiner

*Primary Examiner* — Farzad Kazeminezhad
(74) *Attorney, Agent, or Firm* — CHIP LAW GROUP

(57) ABSTRACT

Provided is a signal processing apparatus which includes an interval detection unit to detect a time interval containing a sound that is emitted from a mobile body and that is included in a recording signal obtained by collecting sounds around the mobile body in a state where another mobile body is present around the mobile body, the time interval being detected on the basis of the recording signal and a sensor signal output from a sensor attached to the mobile body.

12 Claims, 16 Drawing Sheets

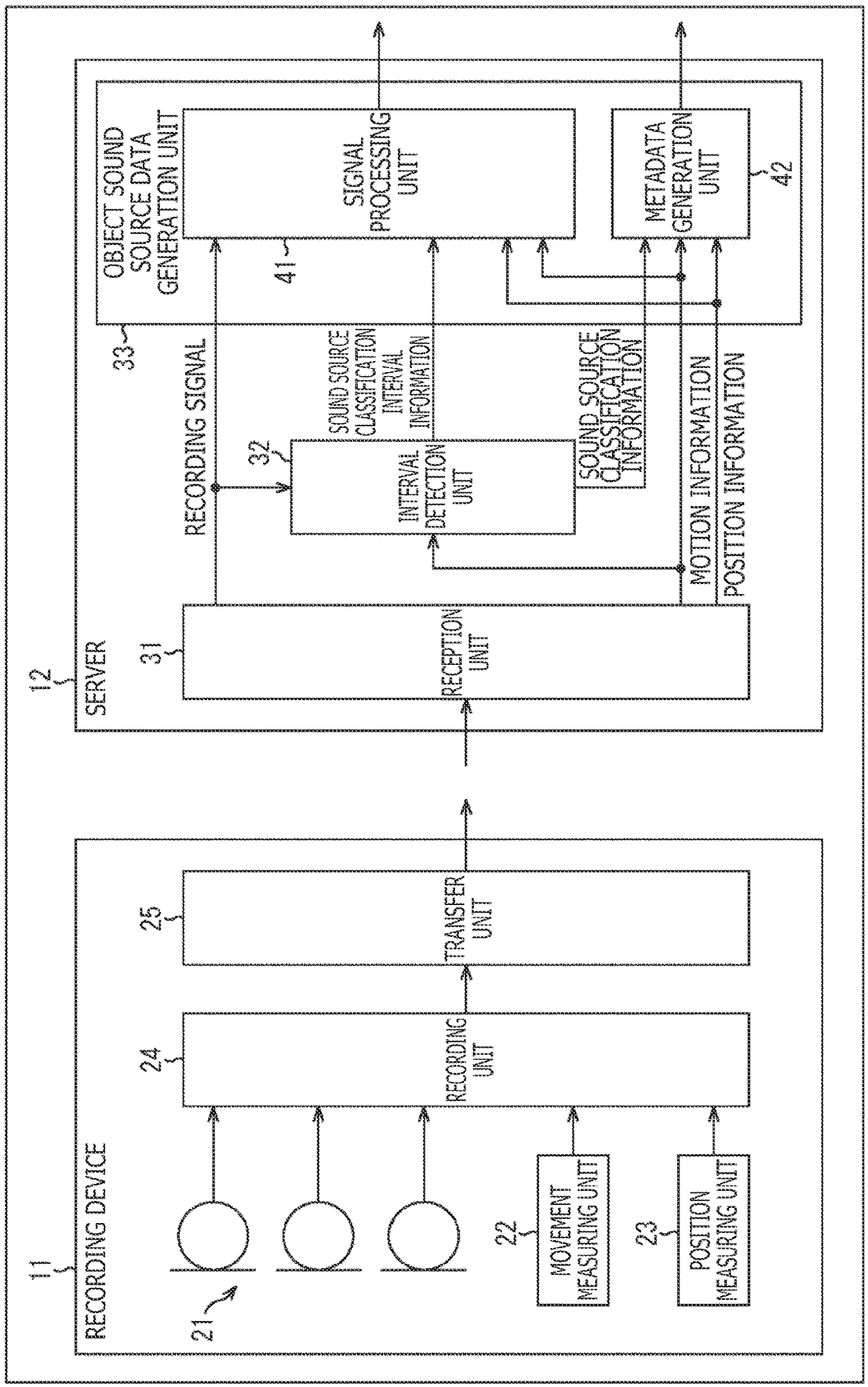
F I G . 1

F I G. 2

| OBJECT (MOBILE BODY)<br>- EMITTING SOUND OF OBJECT SOUND SOURCE<br>- RECORDING DEVICE ATTACHED | CONTENT OF RECORDING TARGET | GENERATED SOUND FROM OBJECT SOUND SOURCE (CLASSIFICATION EXAMPLE OF SOUND EMITTED BY OBJECT) |
|---|---|---|
| | COMMON | VOICE (INCLUDING ACTOR'S LINE, ETC.) |
| | | WALKING SOUND |
| | | RUNNING SOUND |
| | | APPLAUSE |
| | SPORT | PASSING SOUND |
| | | SHOOTING SOUND |
| | | WHISTLE, ETC. |
| | MUSIC | INSTRUMENT SOUND |
| | PLAY/DANCE | SOUND ASSOCIATED WITH BEHAVIOR (SOUND USING CLOTHES, ETC.) |

SIGNAL PROCESSING APPARATUS, METHOD, AND PROGRAM TO DETECT A TIME INTERVAL CONTAINING SOUND BASED ON A DISTANCE BETWEEN TWO MOBILE BODIES

CROSS REFERENCE TO RELATED APPLICATIONS

This application is a U.S. National Phase of International Patent Application No. PCT/JP2020/033612 filed on Sep. 4, 2020, which claims priority benefit of Japanese Patent Application No. JP 2019-169093 filed in the Japan Patent Office on Sep. 18, 2019. Each of the above-referenced applications is hereby incorporated herein by reference in its entirety.

TECHNICAL FIELD

The present technology relates to a signal processing apparatus, a method, and a program, and particularly to a signal processing apparatus, a method, and a program that make it possible to obtain a high-quality target sound.

BACKGROUND ART

For reproduction of a sound field generated from a free viewpoint such as a bird's eye view and a walk-through view, it is important to record a sound from a target sound source at a high SN ratio (Signal to Noise ratio), and it is simultaneously necessary to acquire information indicating positions and orientations of the respective sound sources.

Specific examples of the sound from the target sound source include a voice from a human, a general action sound of a human such as a walking sound and a running sound, and an action sound unique to content of a sport, a play, and the like, such as a ball kicking sound.

Besides, as a technology associated with user behavior recognition, for example, there has been proposed such a technology which obtains a behavior recognition result of one or more users by analyzing distance measurement sensor data detected by multiple distance measurement sensors (e.g., see PTL 1).

CITATION LIST

Patent Literature

[PTL 1]
JP 2017-205213A

SUMMARY

Technical Problem

Meanwhile, multiple sound sources are included in a recording space in a case of recording a sport, a play, or the like as content from a free viewpoint. These sound sources may make complicated movements in a certain situation. In such a case, a sound of a target sound source is difficult to obtain at a high SN ratio. Accordingly, a high-quality target sound is difficult to obtain.

The present technology has been developed in consideration of the abovementioned circumstances and aims at obtaining a high-quality target sound.

Solution to Problem

A signal processing apparatus according to an aspect of the present technology includes an interval detection unit configured to detect a time interval containing a sound that is emitted from a mobile body and that is included in a recording signal obtained by collecting sounds around the mobile body in a state where another mobile body is present around the mobile body, the time interval being detected on the basis of the recording signal and a sensor signal output from a sensor attached to the mobile body.

A signal processing method or a program according to an aspect of the present technology includes a step of detecting a time interval containing a sound that is emitted from a mobile body and that is included in a recording signal obtained by collecting sounds around the mobile body in a state where another mobile body is present around the mobile body, the time interval being detected on the basis of the recording signal and a sensor signal output from a sensor attached to the mobile body.

According to the aspect of the present technology, a time interval containing a sound that is emitted from a mobile body and that is included in a recording signal obtained by collecting sounds around the mobile body in a state where another mobile body is present around the mobile body is detected on the basis of the recording signal and a sensor signal output from a sensor attached to the mobile body.

BRIEF DESCRIPTION OF DRAWINGS

FIG. 1 is a diagram depicting a configuration example of a recording system.
FIG. 2 is a diagram explaining objects and object sound sources.

DESCRIPTION OF EMBODIMENTS

Figure 3:
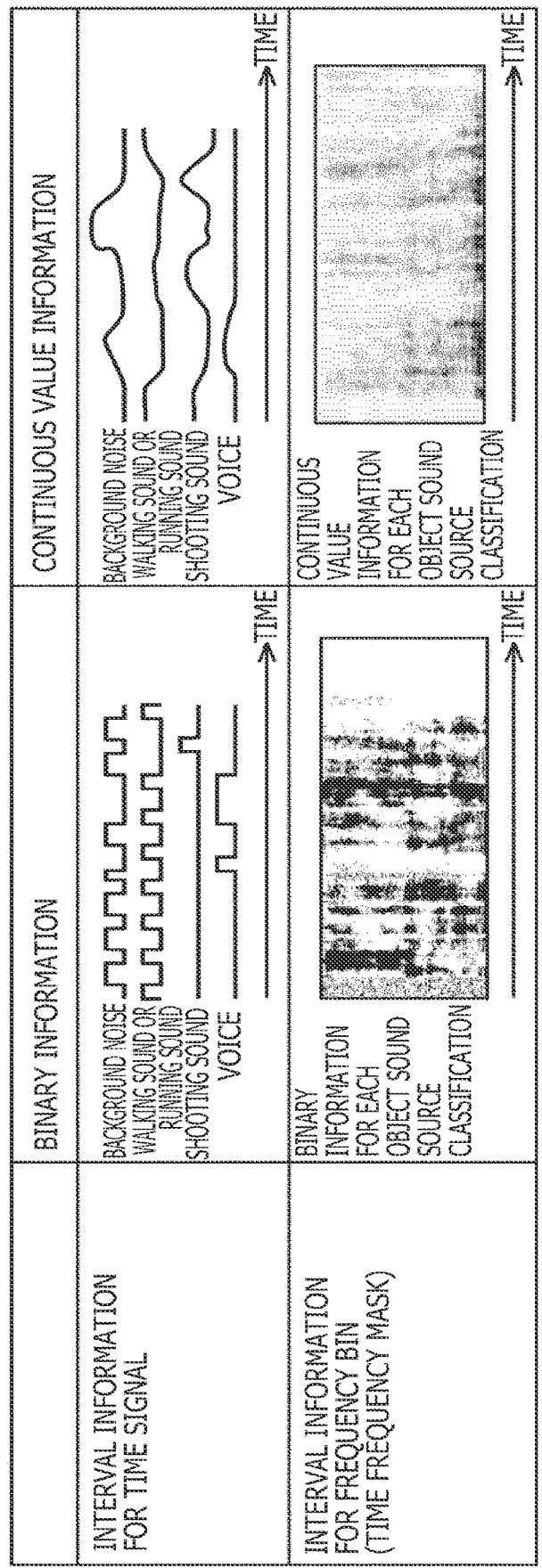
FIG. 3 is a diagram depicting an example of sound source classification interval information.

Embodiments to which the present technology is applied will hereinafter be described with reference to the drawings.

First Embodiment

Configuration Example of Recording System

The present technology is for obtaining a high-quality target sound by attaching a microphone, a distance measurement device, a camera, or the like to each of multiple mobile bodies in a target space and by extracting a sound of the own mobile body while distinguishing the sound of the own mobile body from sounds of the other mobile bodies on the basis of a sound recording signal, position information associated with the mobile bodies, motion information associated with the mobile bodies, a surrounding image, or the like.

Specifically, examples of content to which the present technology is suitably applicable include following items.

Content reproducing a field where a team sport is performed

Content reproducing music performance such as performance by an orchestra, a marching band, or the like Content reproducing a space where multiple players of a musical, an opera, a play, or the like are present Content reproducing any space where a sport day, a live show, various types of events, a parade of a theme park, or the like is performed A space to be recorded will hereinafter be referred to as a target space.

It is particularly assumed herein that multiple mobile bodies are present in an identical target space and that a recording device for recording content is attached to or built in each of these mobile bodies.

In such a case, the mobile bodies to which the recording devices are individually attached or in which the recording devices are individually built are assumed to be objects, and a sound emitted from each of the objects is recorded (collected) as a sound of the corresponding object sound source.

For example, each of the objects (mobile bodies) in the target space may be a human such as a sport player, or may be a robot, a vehicle, or a flying object such as a drone to which the recording device is attached or in which the recording device is built.

In a case where the object is a human, for example, it is preferable that the recording device attached to the human is miniaturized as much as possible so as to avoid an influence on a performance by the human and so as not to be visually recognized by surroundings.

In addition, the recording device includes, for example, a microphone for collecting a sound from the object sound source, a sensor such as nine-axis sensor for measuring a movement or a direction (orientation) of the object, a distance measurement device for measuring a position, a camera for capturing an image of surroundings, or other devices.

The distance measurement device herein is, for example, a GPS (Global Positioning System) device, an indoor distance measurement beacon receiver, or other devices for measuring the position of the object, and position information indicating the position of the object can be acquired using the distance measurement device.

Further, motion information indicating a movement of the object, such as a speed and an acceleration, or indicating a direction (orientation) of the object is acquirable on the basis of an output from the sensor provided on the recording device.

The recording device acquires a recording signal which is an audio signal obtained by collecting a sound around the object, position information associated with the object, and motion information associated with the object, by using the microphone, the sensor, and the distance measurement device built in the recording device. In addition, in a case where a camera is provided on the recording device, an image signal of an image around the object is also acquirable.

The recording signal, the position information, the motion information, and the image signal thus obtained for each object are used for obtaining an object sound source signal which is an audio signal of a sound generated from an object sound source as a target sound.

Examples of the sound from the object sound source as the target sound herein include a voice uttered by a human as an object, a walking sound or a running sound of the object, and an action sound such as an applause sound.

The recording signal obtained for each object includes not only a sound emitted from the object itself but also a sound emitted from another object located nearby. In addition, the recording signal includes sounds that belong to the object but are emitted from multiple object sound sources different from one another, i.e., sounds of different classifications, such as a voice uttered by the object itself and an action sound.

In the present technology, it is possible to differentiate (distinguish) between sounds contained in the recording signal and generated from respective object sound sources and to extract an object sound source signal of each of the object sound sources from the recording signal, by using the position information, the motion information, and the image signal that are obtained for each object, as necessary.

Specifically, a time interval that is included in the recording signal and that contains a sound of the corresponding object sound source is detectable by specifying an action state of the object on the basis of the motion information, for example.

Accordingly, a high-quality object sound source signal exhibiting a high SN ratio is acquirable, for example, by extracting a signal in the interval of the sound of the object sound source from the recording signal and by performing signal processing such as sound quality correction, sound source separation, and noise removal on the extracted signal, as necessary.

In addition, a higher-quality object sound source signal is acquirable by integrating pieces of information such as the position information, the motion information, and the image signal that are obtained for each of the multiple objects, and thus increasing accuracy of a detection result of the time interval of the sound from the object sound source.

Hereinafter, the present technology will be described in more detail.

FIG. 1 is a diagram depicting a configuration example of a recording system according to an embodiment to which the present technology is applied.

In an example depicted in FIG. 1, the recording system includes a recording device 11 attached to an object which is a mobile body, and a server 12 which receives transfer data from the recording device 11 and which generates an object sound source signal.

Note that the recording device 11 may be built in the mobile body. However, it is assumed in the following description that the recording device 11 is attached to the mobile body.

The recording device 11 is attached to an object which is a mobile body freely movable in a target space as a recording target. The recording device 11 generates transfer data containing a recording signal, position information, and motion information and transmits the generated transfer data to the server 12.

Note that, while only the one recording device 11 is depicted herein, multiple recording devices 11 are present in an actual situation and are each attached to corresponding one of multiple objects different from one another.

The server 12 outputs, as data of content, object sound source data including an object sound source signal of each of the object sound sources and metadata, on the basis of the transfer data received from the multiple recording devices 11. Note that the server 12 is not required to be disposed in the target space.

In addition, the recording device 11 includes a microphone 21, a movement measuring unit 22, a position measuring unit 23, a recording unit 24, and a transfer unit 25.

The microphone 21 collects a sound around the recording device 11 and supplies a recording signal obtained as a result of the sound collection to the recording unit 24. Note that the recording signal may be a monaural signal. However, it is assumed in this description that the recording signal is a multichannel signal.

The recording device 11 collects a sound using the microphone 21 in a state where not only the object to which the recording device 11 is attached, but also other objects are present around the recording device 11. Accordingly, a sound associated with the recording signal contains sounds from multiple sound sources.

The movement measuring unit 22 includes a sensor for measuring a movement or a direction of the object, such as a nine-axis sensor, a magnetic field sensor, an acceleration sensor, or a gyro sensor, and outputs, as motion information, a sensor signal indicating a measurement result (sensing value) to the recording unit 24.

Particularly, the movement measuring unit 22 measures the movement or the direction of the object during collection of a sound by the microphone 21 and outputs motion information indicating a result of this measurement.

Note that described herein is an example where the sensor signal is used as the motion information without change. However, the motion information may be generated from the sensor signal by performing signal processing on the sensor signal using the recording unit 24, as necessary.

In addition, the movement measuring unit 22 may be provided outside the recording device 11 and attached to a position different from the position of the recording device 11 attached to the object.

For example, the position measuring unit 23 includes a distance measurement device such as a GPS device and an indoor distance measurement beacon receiver. The position measuring unit 23 measures a position of the object to which the recording device 11 is attached, and outputs position information indicating a result of this measurement to the recording unit 24.

Note that the recording signal, the motion information, and the position information are simultaneously acquired in an identical period of time.

The recording unit 24 performs AD (Analog to Digital) conversion or the like on the recording signal supplied from the microphone 21, the motion information supplied from the movement measuring unit 22, and the position information supplied from the position measuring unit 23, as necessary, and supplies the processed signal and information to the transfer unit 25.

The transfer unit 25 generates transfer data containing the recording signal, the motion information, and the position information supplied from the recording unit 24, by performing a compression process or the like on the recording signal, the motion information, and the position information. Then, the transfer unit 25 transmits the obtained transfer data to the server 12 via a wireless network or the like.

In addition, the server 12 includes a reception unit 31, an interval detection unit 32, and an object sound source data generation unit 33.

The reception unit 31 receives the transfer data transmitted from each of the multiple recording devices 11 and extracts the recording signal, the position information, and the motion information from the transfer data.

The reception unit 31 supplies the recording signal to the interval detection unit 32 and the object sound source data generation unit 33. In addition, the reception unit 31 supplies the motion information to the interval detection unit 32 and also supplies the motion information and the position information to the object sound source data generation unit 33.

The interval detection unit 32 detects, for each of the recording signals, a classification (type) of a sound contained in the recording signal and generated from an object sound source, i.e., a classification of the object sound source, and a time interval containing the sound of the object sound source, on the basis of the recording signal and the motion information supplied from the reception unit 31.

The interval detection unit 32 supplies, to the object sound source data generation unit 33, sound source classification interval information indicating a classification and a time interval of the sound of the object sound source detected from the recording signal.

In addition, the interval detection unit 32 supplies, to the object sound source data generation unit 33, sound source classification information indicating an object corresponding to the recording signal, and indicating a classification of the sound of the object sound source detected from the recording signal. In other words, the sound source classification information is information indicating both the classification of the object sound source which is a sound source of the sound based on the object sound source signal, and an object corresponding to a generation source of this sound.

The object sound source data generation unit 33 generates object sound source data on the basis of the recording signal, the motion information, and the position information that are supplied from the reception unit 31 and on the basis of the sound source classification interval information and the sound source classification information that are supplied from the interval detection unit 32. Then, the object sound source data generation unit 33 outputs the generated object sound source data to a reproduction device or the like disposed in the following stage.

The object sound source data generation unit 33 includes a signal processing unit 41 and a metadata generation unit 42.

The signal processing unit 41 performs predetermined signal processing on the recording signal supplied from the reception unit 31, on the basis of the sound source classification interval information supplied from the interval detection unit 32 and the motion information and the position information supplied from the reception unit 31. Thus, an object sound source signal is generated.

The object sound source signal is herein generated by performing one or more types of signal processing, such as processing of extracting a time interval of the sound of the object sound source from the recording signal and processing of muting a time interval containing no sound of the object sound source of the recording signal, on the basis of the sound source classification interval information, for example.

In addition, the metadata generation unit 42 generates metadata of each object sound source, i.e., each object sound source signal, that contains the sound source classification information supplied from the interval detection unit 32 and the motion information and the position information supplied from the reception unit 31.

Object sound source data including the object sound source signals and the metadata thus obtained is output from the object sound source data generation unit 33 to the following stage.

<Respective Units of Server>

Next, the respective units included in the server 12 will be described in more detail.

The interval detection unit 32 will first be described.

Note that, where appropriate, a predetermined object to which attention is paid will hereinafter also be referred to as a target object, and an object other than the target object will also be referred to as another object.

The interval detection unit 32 differentiates a sound contained in the recording signal and emitted by the target object from a sound contained in the recording signal and emitted by the other object, specifies a classification of the sound emitted by the target object, and detects a time interval of the sound emitted by the target object.

As described above, the interval detection unit 32 receives, as input, the recording signal and the motion information and outputs sound source classification interval information and sound source classification information corresponding to the input.

It is assumed herein that a mobile body to which the recording device 11 is attached is an object and that each portion of the object serves as an object sound source, as depicted in FIG. 2, for example. A sound of the object sound source is assumed to be emitted from the object thus defined. Note that, more specifically, it is also assumed that a musical instrument or the like carried by the object may serve as the object sound source.

In addition, in the recording device 11 and the server 12, classifications of the object sound sources are defined beforehand.

For example, it is assumed that some classifications of the object sound source, i.e., some classifications of the sound of the object sound source, are common to all content and that other classifications are different for each content.

Specifically, as depicted in a right part in FIG. 2, examples of the classifications of the sound of the object sound source defined as classifications common to all content include a voice emitted by a person as an object, and a walking sound, a running sound, and an applause sound of this person.

In addition, examples of the classifications of the sound of the object sound source defined as classifications unique to content associated with a sport include a passing sound, a shooting sound, and a whistle sound. Examples of the classifications of the sound of the object sound source defined as classifications unique to content associated with music include an instrument sound. Further, examples of the classifications of the sound of the object sound source defined as classifications unique to content associated with a play, a dance, or the like include a sound associated with a behavior of an actor, such as a rustle of clothes and a step sound.

The interval detection unit 32 generates sound source classification interval information indicating to which classification the sound of the object sound source belongs and in which time interval the sound is contained in the recording signal.

This sound source classification interval information may have any form, such as binary information indicating 0 or 1 and probability information expressed by a continuous value, as depicted in FIG. 3, for example. Further, the sound source classification interval information may be either interval information for a time signal or interval information for each frequency bin.

For example, in an example depicted in an upper left part in FIG. 3, the sound source classification interval information is binary information that is defined for each object sound source and that indicates whether or not a sound of an object sound source is contained at each point of time in the recording signal given as a time signal.

In this example, respective lines indicate whether or not "background noise," a "walking sound or running sound," a "shooting sound," and a "voice," which are the object sound sources, are contained at each point of time.

Particularly, a horizontal direction of each line indicates a time. An interval where the line protrudes upward indicates that a sound of the object sound source is contained in this interval.

In addition, in an example depicted in an upper right part in FIG. 3, the sound source classification interval information is continuous value information that is defined for each object sound source and that indicates a probability value representing a probability that a sound of the object sound source is contained at each point of time in the recording signal given as a time signal.

In this example, respective curved lines indicate probability values representing probabilities that "background noise," a "walking sound or running sound," a "shooting sound," or a "voice" as the object sound sources are contained at each point of time.

Each of the continuous probability values indicating the probability that the sound of the corresponding object sound source is contained is an output value of DNN (Deep Neural Network) obtained by machine learning or the like when detection of the object sound source is set to a problem of identification from multiple classes, for example.

Further, in an example depicted in a lower left part in FIG. 3, the sound source classification interval information is binary information in a time frequency mask form generated for each object sound source classification.

This binary information in the time frequency mask form represents, by using a binary value, whether or not a sound of the object sound source is contained in each time interval (point of time) of the recording signal, for each component of time frequency bins of the recording signal. Particularly in this example, a vertical axis indicates a time frequency bin, while a horizontal axis indicates time.

In addition, in an example depicted in a lower right part in FIG. 3, the sound source classification interval information is continuous value information in a time frequency mask form generated for each object sound source classification. Similarly to above, a vertical axis in this example indicates a time frequency bin, while a horizontal axis indicates time.

This continuous value information in the time frequency mask form represents, by using a continuous value, a probability that a sound of the object sound source is contained in each time interval (point of time) of the recording signal, for each component of time frequency bins of the recording signal.

Note that the sound source classification interval information is not limited to the examples depicted in FIG. 3 and may be information in any form. It is sufficient to appropriately determine which form of the sound source classification interval information is to be used, depending on signal processing performed by the signal processing unit 41 disposed in the following stage.

In addition, for generating the sound source classification interval information, the interval detection unit 32 detects a sound of an object sound source for each classification in each time interval of the recording signal. In other words, the time interval of the sound of the object sound source is detected for each classification.

The motion information obtained by the recording device 11 is information indicating a movement or a direction of the object during sound collection performed by the microphone 21 to obtain the recording signal.

Accordingly, it is possible to determine whether a sound contained in each of the time intervals of the recording signal is a sound emitted from the object or a sound emitted from a surrounding object, by detecting the time intervals each containing the sound of the object sound source on the basis of the motion information.

Examples of the sound of the object sound source include various types of action sounds such as a walking sound, a running sound, an applause sound, a shooting sound during soccer, and a step sound during dancing.

For example, adoptable as a method for detecting a time interval of an action sound is such a method which detects a time interval of an action sound using a simple algorithm such as threshold process using a threshold.

In such a case, a time interval in which a sensing value of a sensor as the motion information falls within a specific range defined for an action sound to be detected is set to the time interval of the action sound, for example.

In addition, an identifier such as DNN may be created by multimodal learning, for example, and may be used for detection of the time interval of the action sound.

In this case, an identifier such as DNN is created by learning. The identifier receives, as input, the recording signal and a sensor value of a sensor such as an acceleration sensor, a magnetic field sensor, and a gyro sensor, the sensor value being obtained as the motion information, for example, and outputs presence or absence of an action sound in each of time intervals of the recording signal.

Note that, as the identifier described above, such an identifier which sets multiple action sounds common to all content to detection targets or such an identifier which sets an action sound unique to content to a detection target can be used, for example.

Here, a specific example of detection of a time interval of an action sound will be described.

For example, in a case of detecting a time interval of a walking sound or a running sound of an object as an action sound, it is sufficient to use, as the motion information, a sensor value indicating an acceleration of the object in an up-down direction measured by an acceleration sensor.

In this case, walking or running of the object is detectable on the basis of a change of the sensor value. For example, a time interval in which a frequency of a time waveform of the sensor value, i.e., a frequency of oscillation, is approximately 2 Hz or lower is identified as an interval in which the object is performing a walking action, i.e., a time interval of a walking sound. Similarly, a time interval in which the oscillation frequency of the sensor value is approximately in a range of 3 to 4 Hz, for example, is identified as an interval in which the object is performing a running action, i.e., a time interval of a running sound.

In addition, in a case of detecting a time interval of a ball kicking sound as an action sound or a time interval of a sound associated with shooting during a ball game, it is sufficient to use, as the motion information, information associated with a rotation angle or the like that is chiefly measured by a gyro sensor and that indicates rotation of the object. This information is adoptable as the motion information because a human as the object rotates his or her body at the time of a ball kicking action or a spotting action.

Further, in a case of detecting a time interval of a sound of a finger snap as an action sound or a time interval of a sound produced when the object hits his or her body, for example, it is sufficient to use a change of a sensor value of an acceleration sensor, a gyro sensor, a magnetic field sensor, or other sensors.

In this case, for example, an acceleration sensor, a gyro sensor, or a magnetic field sensor that serves as the movement measuring unit 22 is attached to a body portion, a wrist, an arm, or the like of the human as the object to detect a movement of the body or a movement of the hand of the object, for example, on the basis of a change amount of the sensor value corresponding to the attached portion.

In addition, in case of detecting, as a time interval of an action sound, a time interval of a breath sound of a human as an object, it is sufficient to use, as the motion information, a sensor value indicating a small displacement of the object in an up-down direction measured by an acceleration sensor.

In this case, a breath action of the object is detectable on the basis of a change of the sensor value. For example, a time interval in which a frequency of oscillation of the sensor value is approximately in a range of 0.5 to 1 Hz is identified as a time interval in which a breath action allowing recording of a breath sound at a bearable level is performed, i.e., a time interval of a breath sound of the object.

In addition, a time interval of a sound of each of the object sound sources may be detected using an identifier such as DNN which receives, as input, the recording signal and the motion information and which outputs presence or absence of the sound of the object sound source, on the basis of a characteristic of each of actions at the time of emission of a sound from the corresponding object as described above.

Figure 4:
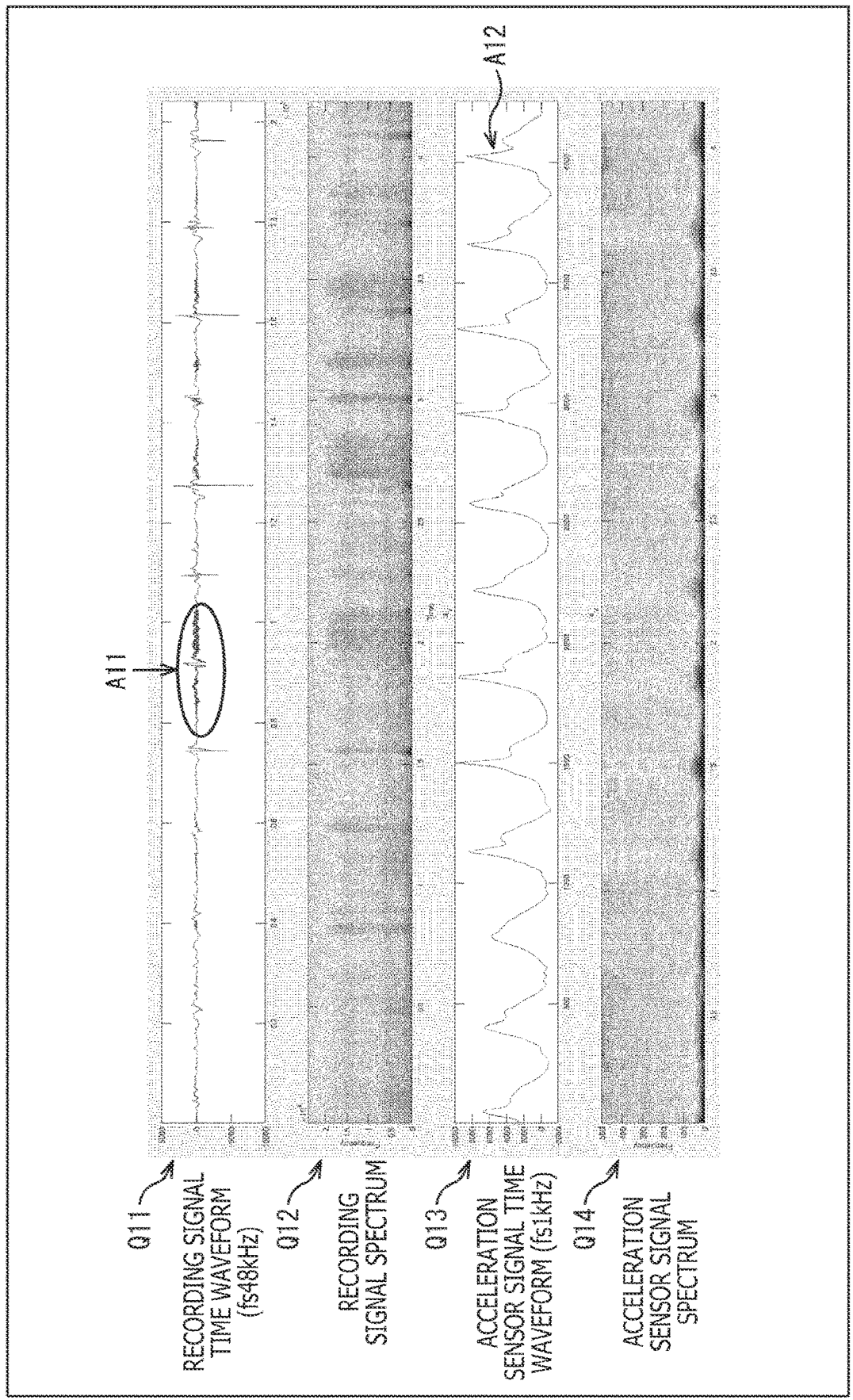
FIG. 4 is a diagram explaining generation of the sound source classification interval information.

For example, as depicted in FIG. 4, a time interval of a walking sound as a sound from the object sound source is accurately detectable by an identifier using the recording signal and a sensor value (sensor signal) of an acceleration sensor as the motion information.

In FIG. 4, a time waveform of the recording signal is presented in a part indicated by an arrow Q11, while a spectrum of the recording signal is presented in a part indicated by an arrow Q12. In addition, a time waveform of the sensor signal of the acceleration sensor is presented in a part indicated by an arrow Q13, while a spectrum of this sensor signal is presented in a part indicated by an arrow Q14. Note that a horizontal direction in each of the parts indicated by the arrows Q11 to Q14 in the figure represents time.

In this example, a walking sound of a target object and a walking sound of another object located around the target object are mixed in a portion indicated by an arrow A11 and the like in the recording signal, for example.

In such a case, it is difficult to determine whether a component of the walking sound contained in the recording signal belongs to the target object or the other object, on the basis of only a time waveform of the recording signal and a spectrum of the recording signal.

Accordingly, it is determined whether such a component belongs to the target object or the other object (differentiation is made), on the basis of not only the recording signal but also the sensor signal (motion information) in this example.

The time waveform of the sensor signal indicated by the arrow Q13 fluctuates cyclically in an up-down direction. A value of this time waveform, i.e., a value of the component in the up-down direction, represents a floor reaction force vertical component of the target object.

Particularly in this case, one protrusion portion protruding upward in the figure, such as a portion indicated by an arrow A12, corresponds to body motion of one step of the target object. It is apparent that the sensor signal contains information indicating body motion of the target object at a high SN ratio.

In addition, it is apparent that a light-dark pattern of the spectrum of the sensor signal indicated by the arrow Q14 also exhibits a clear correspondence with the time waveform of the sensor signal indicated by the arrow Q13.

As described above, the sensor signal contains information indicating the body motion of the target object at a high SN ratio, but does not contain information indicating body motion of the other object at all.

Accordingly, the time interval of the sound of the object sound source of the target object is accurately detectable by using the recording signal and the motion information.

Specifically, in a case where the sound of the other object is contained in the recording signal at the same sound pressure as the sound pressure of the target object, for example, the time interval of the sound of the target object is difficult to accurately detect by using only the recording signal. However, the time interval of the sound of the target object is accurately detectable by using not only the recording signal but also the motion information.

Generally, such a method which estimates a behavior of an object on the basis of a sensor value of an acceleration sensor, a gyro sensor, a magnetic field sensor, or other sensors is often proposed in a field of behavior recognition and the like.

On the other hand, the interval detection unit 32 differentiates between a sound emitted from the target object and a sound emitted from the other object, by using the recording signal and the motion information, for each classification of the sound of the object sound source, as described above.

Note that walking and running are each defined as a continuous action in a field of behavior recognition, physiotherapy, or the like, for example, and is thus often described as a continuous state transition such as a stance phase and a swing phase.

On the other hand, for example, the interval detection unit 32 detects a time interval in which a walking sound or a running sound is actually produced, i.e., a time interval from a ground contact of a foot, more specifically, a heel or a toe, of a human as an object to foot off, is detected as a time interval of a walking sound or a running sound.

In addition, a time interval of a voice uttered from an object as a sound of an object sound source is also accurately detectable on the basis of the motion information.

For example, in a case where the movement measuring unit 22 is attached to a portion around the neck or the head of a human as an object, when the target object gives utterance, information indicating body motion caused by the utterance is observed at a high SN ratio in a sensor signal corresponding to the motion information.

Accordingly, similarly to the case of the action sound, highly accurate differentiation between a voice emitted from a target object and a voice emitted from another object is also achievable for a time interval of an uttered voice by using the recording signal and the motion information.

Note that the motion information which contains information indicating body motion during uttering of the target object at a high SN ratio may be difficult to obtain in a certain case.

In such a case, however, it is sufficient to utilize such a property that, when a voice uttered from a target object to which the recording device 11 is attached is collected by multiple microphones included in the microphone 21, a traveling direction of the uttered voice toward the respective microphones becomes substantially constant, for example.

Specifically, for example, the interval detection unit 32 performs DS (Delay and Sum beamforming) on the recording signal obtained by each of the multiple microphones, to emphasize a component of the recording signal in the orientation to which the voice of the target object travels.

In this manner, differentiation between a voice uttered by the target object and a voice uttered by the other object is accurately achievable by using the recording signal obtained as described above and the motion information.

In addition, for example, the interval detection unit 32 may reduce a component of a voice uttered by the target object and contained in the recording signal, by using NBF (Null Beamformer).

In this case, a comparison is made between a time interval of a voice uttered by the target object and detected from the recording signal that is yet to be subjected to component reduction and a time interval of a voice uttered by the target object and detected from the recording signal that has been subjected to the component reduction. Thereafter, a time interval detected from the recording signal before the component reduction but not detected from the recording signal after the component reduction is determined as a final time interval of the voice uttered by the target object.

Next, a process performed by the signal processing unit 41 will be described in more detail.

The signal processing unit 41 performs signal processing on the basis of the sound source classification interval information obtained by the interval detection unit 32, the motion information, the position information, and the recording signal, to generate an object sound source signal which is an audio signal for each object sound source classification.

For example, the signal processing unit 41 performs, as signal processing on the recording signal, a sound quality correction process, a sound source separation process, a noise removal process, a distance correction process, a sound source replacement process, or a process combining these multiple processes.

More specifically, performed as the sound quality correction process, for example, is a process for improving the quality of a sound of an object sound source (sound quality) by reducing sounds other than a target, such as noise generated at a contact portion between the recording device 11 and the object due to a movement of the object, for example.

Specifically, examples of the sound quality correction process include a process which reduces noise, such as a filtering process and gain correction for reducing a noise-dominant frequency band, and a process which mutes an interval containing a large volume of noise, an unnecessary interval, and an interval containing an inappropriate voice or the like during content viewing and listening.

Incidentally, it is conceivable that the time interval containing an inappropriate voice is detected on the basis of the sound source classification interval information or detected by performing a voice recognition process or the like on the recording signal, for example.

In addition, performed as the sound quality correction process may be a process which improves the quality of the sound of the object sound source by performing a filtering process for increasing a high-frequency component in a time interval containing the sound of the object sound source whose high-frequency band easily attenuates in the recording signal, for example. In such a case, it is sufficient to perform, as the sound quality correction process, a process set for each object sound source classification, for each of the time intervals of the recording signal on the basis of the sound source classification interval information, for example.

Further, a time interval containing sounds of multiple object sound sources in the recording signal can be specified with reference to the sound source classification interval information, for example.

Accordingly, on the basis of a result of this specification, a sound source separation process based on independent component analysis for separating sounds of respective object sound sources according to an amplitude value and a difference in a probability density distribution for each object sound source classification may be performed on the recording signal.

In addition, signals of the sounds of the respective object sound sources may be separated from the recording signal by performing, as the sound source separation process, beam forming or the like according to an orientation difference between the object sound sources as viewed from the objects.

Further, in a case where a time interval of the recording signal contains a sound of only one object sound source as specified from the sound source classification interval information, a process for cutting out a signal in this time interval as an object sound source signal is performed as the sound source separation process.

These processes allow acquisition of a signal containing a sound of only one object sound source, and this signal can be used as an object sound source signal.

In addition, when an unnecessary sound mainly including stationary noise such as background noise or a cheer and a noise of wind or the like is contained in a time interval of a sound of an object sound source in the recording signal, a process which reduces noise contained in this time interval may be performed as a noise removal process, similarly to the sound quality correction process.

Besides, for example, it is possible to specify whether or not another object is present around the target object, and specify a relative orientation of the other object with respect to the target object and a distance between the target object and the other object, on the basis of the position information and the motion information associated with each of the objects.

As a result, on the basis of these specification results and the sound source classification interval information, it is possible to specify whether or not the sound of the other object is contained in the time interval containing the sound of the object sound source of the target object. Accordingly, extraction (separation) of only the sound of the object sound source of the target object is achievable by performing sound source separation using DNN, for example.

Figure 5:
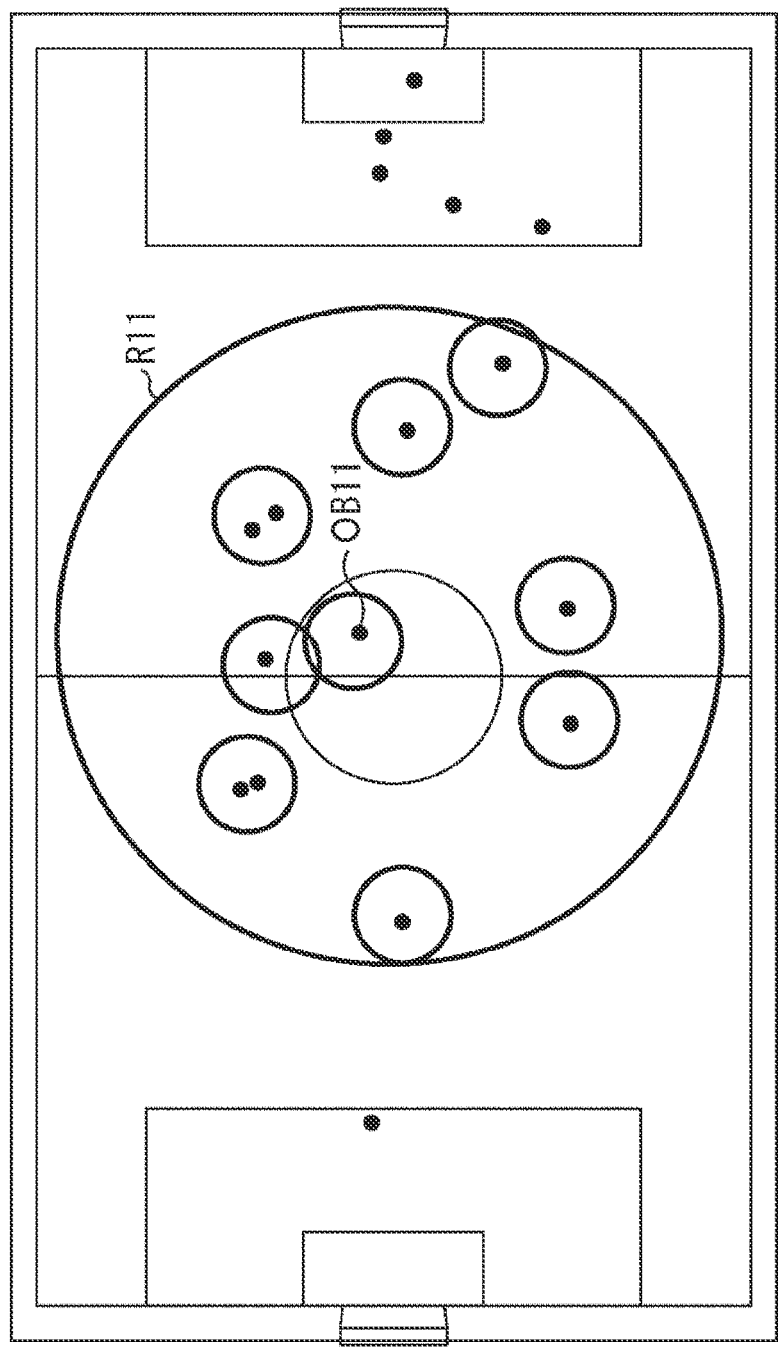
FIG. 5 is a diagram explaining selection of removal target objects.

Note that, for performing such sound source separation described above or the like, other objects located within a circular region R11 having a predetermined radius with the center thereof located at a target object OB11 as depicted in FIG. 5 are set to removal target objects, for example. Each of dots in FIG. 5 represents an object.

In addition, a process of sound source separation or the like for removing sounds of removal target objects contained in a time interval which contains a sound of the object sound source in the recording signal of the target object OB11 is performed in consideration of distances to the removal target objects and relative orientations of the removal target objects. In other words, a signal of the sound of the object sound source of the target object OB11 is extracted.

At this time, the distances from the target object OB11 to the removal target objects are acquirable on the basis of position information associated with these objects. In addition, the relative orientations of the removal target objects as viewed from the target object OB11 are acquirable on the basis of directions indicated by motion information associated with these objects and position information.

Further, an object located outside the region R11, i.e., located at a predetermined distance or longer from the target object OB11, is not set to the removal target object.

A sound generated from an object at a far position and mixed into the recording signal of the target object OB11 decreases by distance attenuation. Accordingly, there is no need to take into consideration a voice or an action sound generated from such an object, and this object is thus not removed.

In addition, at the time of removal (separation) of the sound of the removal target object, a gain or intensity of the sound of the removal target object during separation may be varied depending on a distance from the target object OB11 to the removal target object. In other words, a mixing volume (contribution ratio) may be handled as a continuously variable factor according to the distance.

In addition, for example, the distance correction process performed as signal processing is a process for correcting an effect produced by distance attenuation or a transfer characteristic from the object sound source to the position of the microphone 21 and convoluted in an absolute sound pressure of a sound emitted from the object sound source during recording.

Specifically, for example, a process which adds, to the recording signal, an inverse characteristic of the transfer characteristic from the object sound source to the microphone 21 may be performed as the distance correction process.

In this manner, sound quality deterioration of the sound of the object sound source caused by the distance attenuation, the transfer characteristic, or the like is correctable, and a relative relation between absolute sound pressures of sounds of respective object sound sources according to a positional relation between the respective object sound sources can be restored at the time of content reproduction.

Further, for example, the sound source replacement process performed as the signal processing is a process which replaces a sound of a predetermined object sound source classification indicated by the sound source classification interval information, with a sound different from a recorded sound, such as a sound prepared beforehand, and which uses the sound after replacement as an object sound source signal.

In other words, in the sound source replacement process, a partial interval of the recording signal or a partial interval of an object sound source signal obtained from the recording signal is replaced with another audio signal prepared beforehand or dynamically generated, on the basis of the sound source classification interval information.

For example, a signal of a sound that is prepared beforehand and that has a high SN ratio may be herein used as an object sound source signal according to the object sound source classification. Such a sound source replacement process is particularly effective in a case where an amplitude of a sensor value as the motion information is large, i.e., a movement of the object is large, and where the sound quality of the recorded sound of the object sound source is low. Accordingly, whether or not to perform the sound source replacement process may be determined on the basis of a result of a threshold process performed on the motion information, for example.

Further, in the sound source replacement process, a signal of a sound that is parametrically generated by, for example, substituting acceleration as the motion information for a function may be used as the object sound source signal.

In addition, in the sound source replacement process, for example, in a case where a time interval containing an inappropriate voice is present as a sound of the object sound source during content viewing and listening, a signal of a predetermined sound prepared beforehand may be used as an object sound source signal in this time interval.

Note that an object sound source signal obtained by the signal processing unit 41 may be either a signal only in a time interval containing a sound of the object sound source, or a signal that corresponds to the entire time interval but that is presented as a silent signal in a time interval where no sound of the object sound source is contained.

Further, the sound quality correction process, the sound source separation process, the noise removal process, the distance correction process, and the sound source replacement process described above can each be implemented in any of the following cases; a case where processing is performed online for each frame of the recording signal; a case where processing is performed using a lookahead frame; a case where processing is performed offline; and other cases. At this time, it is sufficient if the recording signal, the sound source classification interval information, the motion information, the position information, and the like are retained for a frame that precedes a processing target frame of the recording signal, as necessary.

<Description of Recording Process>

Next, operation of the recording device 11 and the server 12 will be described.

The operation of the recording device 11 will first be explained. The recording device 11 is attached to an object and performs a recording process in a predetermined period of time such as a period of time in which the object is giving a performance or playing a game.

The recording process performed by the recording device 11 will hereinafter be described with reference to a flowchart in FIG. 6.

In step S11, the recording unit 24 records a surrounding sound.

Specifically, when the microphone 21 collects a surrounding sound and outputs a resultant recording signal, the recording unit 24 acquires the recording signal output from the microphone 21, to obtain a recording signal of the recorded sound.

In step S12, the recording unit 24 acquires motion information and position information from the movement measuring unit 22 and the position measuring unit 23, respectively.

The recording unit 24 performs AD conversion or other processing on the recording signal, the motion information, and the position information that are obtained in the manner described above, as necessary, and supplies the signal and the information thus processed to the transfer unit 25.

In addition, the transfer unit 25 generates transfer data including the recording signal, the motion information, and the position information that are supplied from the recording unit 24. At this time, the transfer unit 25 performs a compression process on the recording signal, the motion information, and the position information, as necessary.

In step S13, the transfer unit 25 transmits the transfer data to the server 12.

Note that an example in which, during recording, the transfer data obtained by the recording is sequentially transmitted to the server 12 on a real time basis (online) will be described herein. However, the transfer data may be accumulated during the recording and be all collectively transmitted to the server 12 offline after the recording.

In step S14, the recording unit 24 determines whether or not to end the process. For example, in a case where an instruction for ending the recording is issued by operating a not-depicted button or the like provided on the recording device 11, the process is determined to be ended.

In a case where the process is not yet determined to be ended in step S14, the process returns to step S11 to repeat the foregoing process.

On the other hand, in a case where the process is determined to be ended in step S14, the respective units of the recording device 11 stop current operations, and the recording process ends.

By performing the process in the manner described above, the recording device 11 collects sounds and measures the movement and the position of the object, and then transmits transfer data containing the recording signal, the motion information, and the position information to the server 12. In such a manner, the server 12 is allowed to obtain a high-quality target sound.

<Description of Data Generation Process>

In addition, when the transfer data is transmitted from each of the recording devices 11 to the server 12, the server 12 performs a data generation process to output object sound source data. The data generation process performed by the server 12 will hereinafter be described with reference to a flowchart in FIG. 7.

In step S41, the reception unit 31 receives the transfer data transmitted from the recording devices 11.

In addition, the reception unit 31 performs a decompression process on the received transfer data, as necessary, to extract a recording signal, motion information, and position information from the transfer data.

Thereafter, the reception unit 31 supplies the recording signal and the motion information to the interval detection unit 32, supplies the recording signal, the motion information, and the position information to the signal processing unit 41, and supplies the motion information and the position information to the metadata generation unit 42.

In step S42, the interval detection unit 32 generates sound source classification interval information for each object (recording device 11) on the basis of the recording signal and the motion information associated with the corresponding object and supplied from the reception unit 31, and supplies the generated sound source classification interval information to the signal processing unit 41.

For example, the interval detection unit 32 specifies an object sound source classification contained in each of time intervals, by performing the threshold process on the recording signal, assigning the recording signal and the motion information to the identifier such as DNN for calculation, and performing DS or NBF on the recording signal in the manner described above. Thus, the interval detection unit 32 generates the sound source classification interval information.

In addition, the interval detection unit 32 generates sound source classification information indicating an object sound source classification of a sound contained in the recording signal and the object, on the basis of a specification result of the object sound source classification contained in each of the time intervals, and supplies the generated sound source classification information to the metadata generation unit 42.

In step S43, the signal processing unit 41 generates an object sound source signal on the basis of the recording signal, the motion information, and the position information that are supplied from the reception unit 31 and on the basis of the sound source classification interval information supplied from the interval detection unit 32.

Specifically, the signal processing unit 41 performs the sound quality correction process, the sound source separation process, the noise removal process, the distance correction process, and the sound source replacement process described above on the recording signal, as necessary, to generate the object sound source signal for each object. At this time, the object sound source signal of the target object is generated by using not only the motion information, the position information, and the sound source classification interval information that are associated with the target object, but also motion information, position information, and sound source classification interval information that are associated with another object.

In step S44, the metadata generation unit 42 generates, for each of the object sound sources of the objects, metadata that contains the sound source classification information supplied from the interval detection unit 32 and the motion information and the position information supplied from the reception unit 31.

When the object sound source signal and the metadata are obtained for each of the object sound sources in such a manner, the object sound source data generation unit 33 outputs object sound source data containing the object sound source signal and the metadata to the following stage for each of the object sound sources.

In step S45, the server 12 determines whether or not to end the process. For example, the process is determined to be ended in step S45 in a case where processing of all the transfer data received from the recording device 11 is completed.

In a case where the process is not yet determined to be ended in step S45, the process subsequently returns to step S41 to repeat the foregoing process.

On the other hand, in a case where the process is determined to be ended in step S45, the respective units of the server 12 stop processing currently performed, and the data generation process ends.

Note that the example in which transfer data is sequentially transmitted on a real time basis from the recording device 11 and in which object sound source data is also sequentially generated from the transfer data using the server 12 has been described herein.

However, the transfer data received from the recording device 11 may be accumulated, and the accumulated transfer data may collectively be processed to generate the object sound source data. In addition, when the transfer data is collectively transmitted from the recording device 11, the received transfer data is only required to be collectively processed to generate the object sound source data.

In the manner described above, the server 12 receives transfer data from the multiple recording devices 11, generates object sound source data using these pieces of transfer data, and outputs the generated object sound source data.

At this time, a high-quality target sound, i.e., a high-quality object sound source signal, is acquirable by generating sound source classification interval information using not only a recording signal but also motion information and by generating object sound source data using the generated sound source classification interval information.

Second Embodiment

<Configuration Example of Recording System>

Note that the example in which information obtained for another object is not used at the time of generation of sound source classification interval information associated with each object has been described above. However, for example, accuracy of the sound source classification interval information may be raised by integrating pieces of information obtained for the respective objects.

Figure 8:
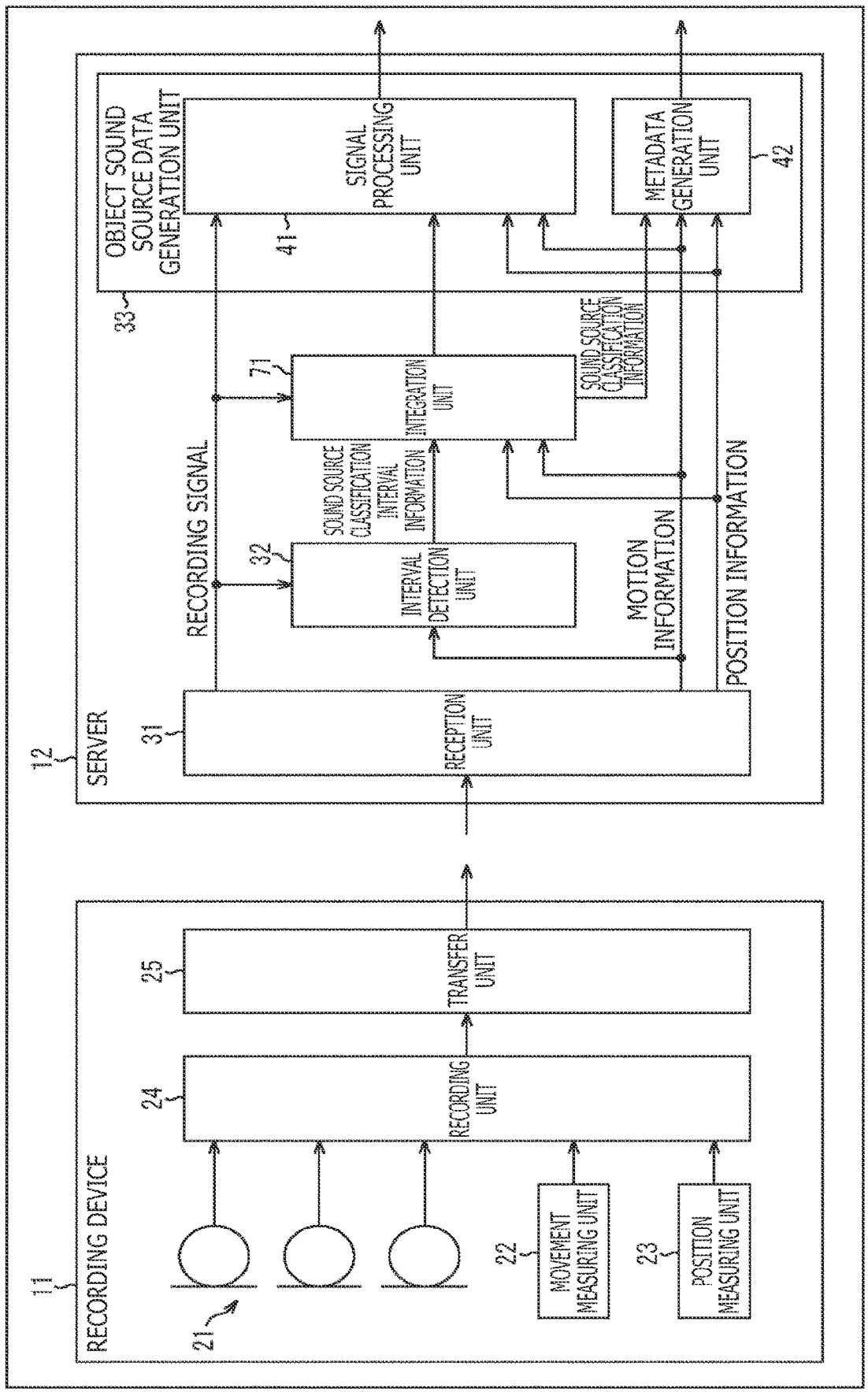
FIG. 8 is a diagram depicting a configuration example of a recording system.

In such a case, the recording system is configured as depicted in FIG. 8, for example. Note that parts in FIG. 8 corresponding to the parts in FIG. 1 are given identical reference symbols, and description of these parts is omitted where appropriate.

The recording system depicted in FIG. 8 includes the recording device 11 and the server 12. The recording device 11 has the same configuration as the configuration depicted in FIG. 1.

On the other hand, the server 12 of the recording system depicted in FIG. 8 includes the reception unit 31, the interval detection unit 32, an integration unit 71, and the object sound source data generation unit 33. In addition, the object sound source data generation unit 33 includes the signal processing unit 41 and the metadata generation unit 42.

The configuration of the server 12 herein is different from the server 12 depicted in FIG. 1 in that the integration unit 71 is provided, and is the same as the configuration of the server 12 depicted in FIG. 1 in other points.

In this example, sound source classification interval information generated by the interval detection unit 32 is supplied to the integration unit 71. In addition, a recording signal, motion information, and position information are supplied from the reception unit 31 to the integration unit 71 in addition to the sound source classification interval information from the interval detection unit 32.

The integration unit 71 generates final sound source classification interval information on the basis of the recording signal, the sound source classification interval information, the motion information, and the position information thus received, and supplies the final sound source classification interval information to the signal processing unit 41. The integration unit 71 also generates sound source classification information and supplies the sound source classification information to the metadata generation unit 42.

Particularly, the integration unit 71 integrates the respective pieces of information such as the motion information and the position information obtained by each of the recording devices 11, to generate more accurate sound source classification interval information.

Note that the example in which the integration unit 71 is separately provided from the interval detection unit 32 will hereinafter be described. However, the integration unit 71 may be provided on the interval detection unit 32. In such a case, the interval detection unit 32 executes, simultaneously with the process described above, the following process to be described later that is performed by the integration unit 71, to generate the sound source classification interval information and the sound source classification information.

The integration unit 71 will be described herein in more detail.

For example, the interval detection unit 32 detects, for each of the objects, i.e., each of the recording devices 11, a time interval estimated to contain an action sound or a voice of the object and generates the sound source classification interval information on the basis of the estimated time interval.

In this case, however, a time interval containing an action sound or a voice of another object may erroneously be detected as a time interval containing an action sound or a voice of the target object, or a time interval that contains an action sound or a voice of the target object and that is required to be detected may not be detected.

Accordingly, the integration unit 71 integrates pieces of information obtained by the respective recording devices 11, to generate more accurate sound source classification interval information.

Specifically, the integration unit 71 performs a position information comparison process, a time interval integration process, and an interval smoothing process on the basis of the sound source classification interval information, the recording signal, the motion information, and the position information for each frame having a predetermined time length, for example, to obtain the final sound source classification interval information.

In other words, the integration unit 71 generates the sound source classification interval information associated with the target object, on the basis of at least any one of the recording signal, the motion information, and the position information that are associated with the target object, and the recording signal, the motion information, and the position information that are associated with the other object.

An example of the position information comparison process, the time interval integration process, and the interval smoothing process described above will hereinafter be further explained.

First, all objects are sequentially selected as target objects, and the position information comparison process, the time interval integration process, and the interval smoothing process are performed for each of the target objects.

In the position information comparison process, a distance between a target object and another object is calculated on the basis of the position information associated with each of the objects.

Thereafter, another object which may influence a sound of an object sound source of the target object, i.e., another object located near the target object, is selected as a reference object on the basis of the calculated distance.

Specifically, for example, an object located at a distance of a predetermined threshold or shorter from the target object is selected as the reference object. In this example, the recording device 11 is attached to each of the objects, and therefore, each of the distances between the recording devices 11 is substantially equivalent to each of the distances between the objects. Accordingly, the distance calculated from the position information is used for selection of the reference object.

Note that an example in which the reference object is selected on the basis of the distance and in which the time interval integration process is performed using information associated with the selected reference object will be described herein.

However, all the objects may be used as the reference objects, and the time interval integration process may be performed using information associated with the reference objects weighted according to the respective distances from the target object.

In the time interval integration process, it is initially determined whether or not the object selected as the reference object by the position information comparison process is present.

Thereafter, in a case where the object selected as a reference object is absent, the sound source classification interval information associated with the target object and obtained by the interval detection unit 32 is output to the signal processing unit 41 without change as final sound source classification interval information. This information is output because a sound of another object is not mixed into the recording signal in a case of absence of another object near the target object.

On the other hand, in a case where the object selected as the reference object is present, the sound source classification interval information associated with the target object is updated using position information and motion information associated with the selected reference object as well. In other words, final sound source classification interval information is generated.

Specifically, a reference object which has, as a time interval containing a sound of an object sound source, a time interval overlapping with a time interval indicated by the sound source classification interval information associated with the target object is selected as the final reference object from the respective reference objects.

Specifically, even though an object is selected as a reference object by the position information comparison process, if the selected object has a time interval that is indicated by the sound source classification interval information and that is not overlapping with the time interval indicated by the sound source classification interval information associated with the target object, this object is excluded from the reference objects.

Subsequently, a relative orientation (direction) of the reference object as viewed form the target object in a three-dimensional space is estimated on the basis of the position information and the motion information that are associated with the reference object and on the basis of the position information and the motion information that are associated with the target object. Then, relative orientation information indicating a result of this estimation is generated. More specifically, a direction (orientation) of the mouth of the reference object as viewed in a front direction of the target object is estimated, for example. Note that the relative orientation information may be generated using only the position information without using the motion information.

In addition, an NBF filter is formed on the basis of the position information associated with the target object, the direction of the target object indicated by the motion information, and the relative orientation information associated with the respective reference objects.

This NBF filter is a filter which implements beam forming for reducing a sound coming in a direction indicated by the relative orientation information while maintaining a gain of a sound coming in a mouth direction of the target object that is indicated by the direction of the target object.

The integration unit 71 performs a convolution process for convoluting the NBF filter obtained in such a manner and the time interval included in the recording signal of the target object and indicated by the sound source classification interval information associated with the target object.

In addition, the integration unit 71 performs processes similar to the processes performed by the interval detection unit 32, i.e., processes such as a threshold process and a calculation process using an identifier such as DNN, to generate sound source classification interval information, on the basis of a signal obtained by the convolution process and the motion information associated with the target object. In such a manner, a sound emitted from the reference object is reduced, and therefore, more accurate sound source classification interval information can be obtained.

Note that the motion information, the position information, the recording signal, or the like associated with the reference object may be input to the identifier such as DNN for performing the calculation process.

Finally, the integration unit 71 performs the interval smoothing process on the sound source classification interval information obtained by the time interval integration process, to obtain final sound source classification interval information.

An average time of minimum duration of a sound produced from the corresponding classification is obtained beforehand as an average minimum duration time for each of the object sound source classifications, for example.

In the interval smoothing process, smoothing is executed using a smoothing filter which connects segmentalized (divided) time intervals each containing a sound of an object sound source such that a length of the time intervals each containing a detected sound of the object sound source continues for the average minimum duration or longer.

In other words, in the interval smoothing process, multiple time intervals that are continuously aligned and that each contain the detected sound of the object sound source of the same classification in the recording signal are connected into one final time interval. At this time, the multiple time intervals to be connected together include at least one time interval having a time width shorter than the average minimum duration time.

For example, the integration unit 71 retains beforehand a smoothing filter formed on the basis of the average minimum duration of the respective object sound source classifications.

The integration unit 71 performs, as the interval smoothing process, filtering (filtering process) on the sound source classification interval information obtained by the time interval integration process, on the basis of the smoothing filter, to obtain final sound source classification interval information. The integration unit 71 then supplies the final sound source classification interval information to the signal processing unit 41. In the interval smoothing process, filtering is performed in some cases on the sound source classification interval information associated with the multiple continuous frames, depending on the object sound source classification, i.e., the average minimum duration.

In addition, the integration unit 71 generates sound source classification information on the basis of the obtained sound source classification interval information, and supplies the generated sound source classification information to the metadata generation unit 42.

In the manner described above, the integration unit 71 removes information associated with the sound of the other object that has not been removed (excluded) on the basis of the sound source classification interval information obtained by the interval detection unit 32, and thus can obtain more accurate sound source classification interval information.

For example, depending on cases, the interval detection unit 32 performs DS or NBF on the recording signal, as necessary, as described above.

However, for example, DS may not sufficiently emphasize a component in an orientation where a voice of a target object comes. In such a case, correct sound source classification interval information may be difficult to obtain when a volume of a sound of another object is large.

In addition, for example, NBF also may not obtain accurate sound source classification interval information in a case where another object is located near the target object and in an orientation near the orientation where the voice of the target object comes, and gives a substantially simultaneous utterance with that of the target object.

On the other hand, the integration unit 71 can obtain more accurate sound source classification interval information by using not only information associated with the target object but also motion information, position information, and sound source classification interval information that are associated with another object.

<Description of Data Generation Process>

In a case where the recording system has a configuration depicted in FIG. 8, each of the recording devices 11 performs the recording process described with reference to FIG. 6 and transmits transfer data to the server 12.

Figure 9:
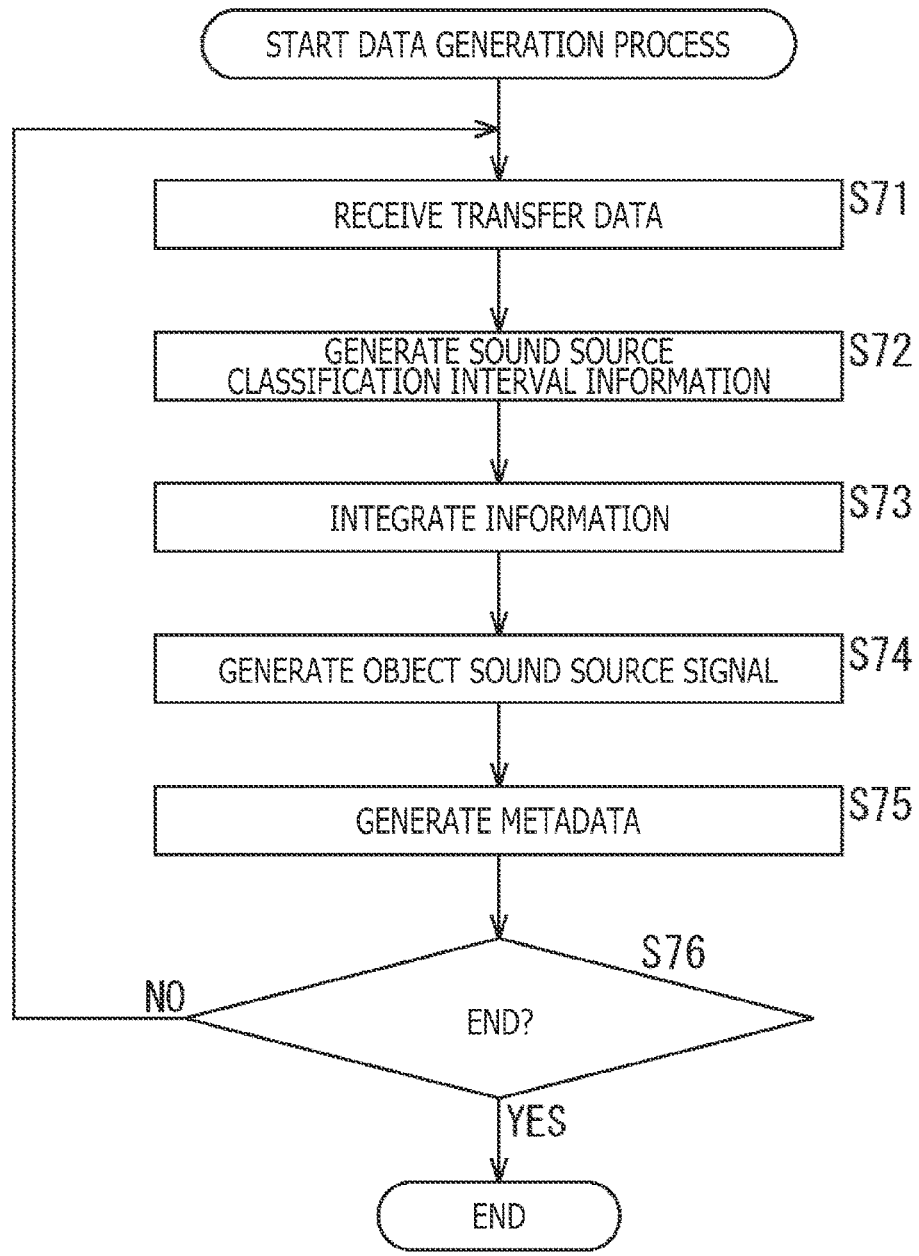
FIG. 9 is a flowchart explaining a data generation process.

Thereafter, the server 12 performs a data generation process depicted in FIG. 9. The data generation process performed by the server 12 depicted in FIG. 8 will hereinafter be described with reference to a flowchart in FIG. 9.

Figure 7:
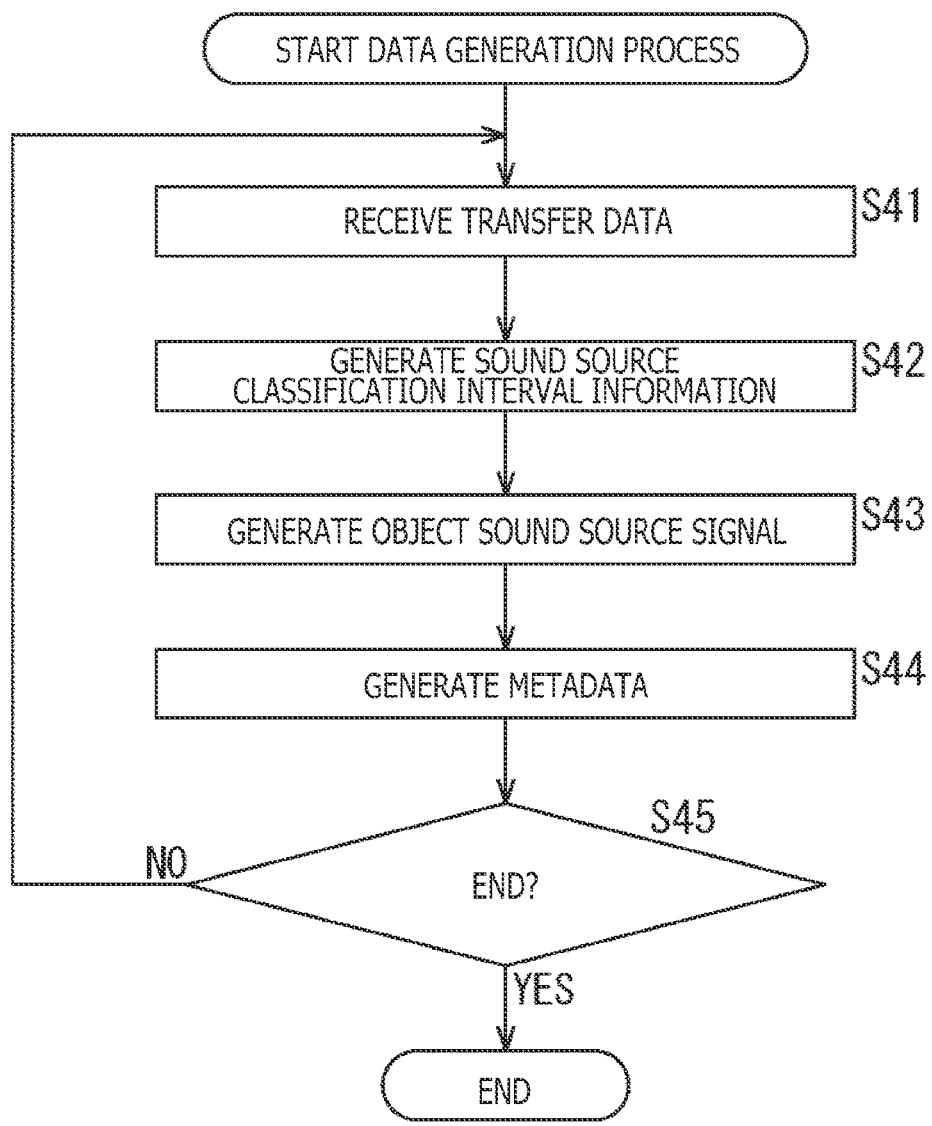
FIG. 7 is a flowchart explaining a data generation process.

Note that processes in step S71 and step S72 are similar to the processes in step S41 and step S42 in FIG. 7 and are thus not repetitively described.

However, in step S71, a recording signal, motion information, and position information extracted by the reception unit 31 from the transfer data are also supplied to the integration unit 71.

In addition, in step S72, generated sound source classification interval information is supplied from the interval detection unit 32 to the integration unit 71.

In step S73, the integration unit 71 integrates pieces of information supplied from the interval detection unit 32 and the reception unit 31.

Specifically, the integration unit 71 performs a position information comparison process, a time interval integration process, and an interval smoothing process on the basis of the recording signal, the motion information, and the position information that are supplied from the reception unit 31 and on the basis of the sound source classification interval information supplied from the interval detection unit 32, to obtain final sound source classification interval information.

The integration unit 71 supplies the obtained final sound source classification interval information to the signal processing unit 41, generates sound source classification information on the basis of the final sound source classification interval information, and supplies the generated sound classification information to the metadata generation unit 42.

After the sound source classification interval information is obtained in such a manner, processes in step S74 to step S76 are performed. Thereafter, the data generation process ends. These processes are similar to the processes in step S43 to step S45 in FIG. 7 and are thus not repetitively described.

In the manner described above, the server 12 receives transfer data from the multiple recording devices 11, generates object sound source data using these pieces of transfer data, and outputs the generated object sound source data.

At this time, a higher-quality target sound can be obtained by generating the final sound source classification interval information associated with the target object using information associated with another object as well.

Third Embodiment

<Configuration Example of Recording System>

In addition, according to the above description, the recording signal and the position information are used for generating the sound source classification interval information. However, image information may further be used for this purpose.

Figure 10:
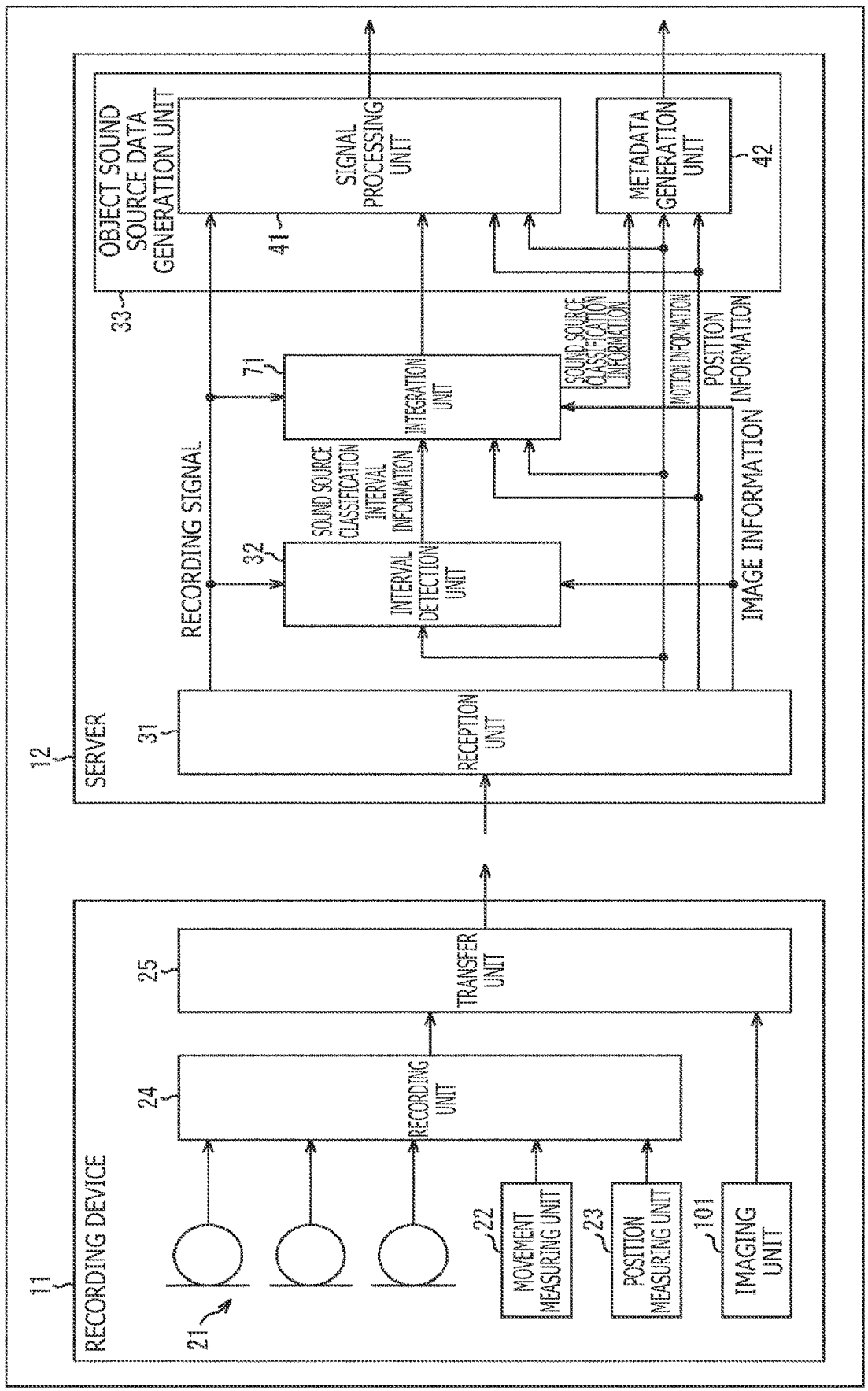
FIG. 10 is a diagram depicting a configuration example of a recording system.

In such a case, the recording system is configured as depicted in FIG. 10, for example. Note that parts in FIG. 10 corresponding to the parts in FIG. 8 are given identical reference symbols, and description of these parts is omitted where appropriate.

The recording system depicted in FIG. 10 includes the recording device 11 and the server 12.

In this example, the recording device 11 includes the microphone 21, the movement measuring unit 22, the position measuring unit 23, an imaging unit 101, the recording unit 24, and the transfer unit 25.

The configuration of the recording device 11 depicted in FIG. 10 is different from the configuration of the recording device 11 depicted in FIG. 8 in that the imaging unit 101 is provided, and is the same as the configuration of the recording device 11 depicted in FIG. 8 in other points.

The imaging unit 101 includes a small-sized camera and is configured to capture an image containing a part of an object as a subject from a viewpoint corresponding to the position of the object, for example, and supply obtained image information (image signal) to the transfer unit 25. Note that an image based on the image information contains no object as a subject in some cases.

The transfer unit 25 generates transfer data containing a recording signal, motion information, and position information supplied from the recording unit 24, and the image information supplied from the imaging unit 101, and transmits the generated transfer data to the server 12.

Meanwhile, the server 12 includes the reception unit 31, the interval detection unit 32, the integration unit 71, and the object sound source data generation unit 33. The object sound source data generation unit 33 includes the signal processing unit 41 and the metadata generation unit 42.

In this case, the configuration of the server 12 depicted in FIG. 10 is the same as the configuration of the server 12 depicted in FIG. 8. However, the server 12 depicted in FIG. 10 supplies the image information extracted by the reception unit 31 from the transfer data, to the interval detection unit 32 and the integration unit 71.

Accordingly, the interval detection unit 32 generates the sound source classification interval information on the basis of the recording signal, the motion information, and the image information that are supplied from the reception unit 31.

For example, in a case where an image based on the image information contains a part of a target object as a subject, the image information is used for detection of an action of the target object.

Specifically, for example, the sound source classification interval information is corrected on the basis of an action of the target object detected at each point of time on the basis of the image information.

Alternatively, for example, a calculation may be made by assigning the image information, the motion information, and the recording signal to an identifier such as DNN, to obtain the presence or absence of an action sound at each point of time in the recording signal.

Similarly, the integration unit 71 also performs a position information comparison process, a time interval integration process, and an interval smoothing process on the basis of the recording signal, the motion information, the position information, the image information, and the sound source classification interval information.

At this time, the image information may be used for detection of an action of the target object, the time interval integration process, or the like similarly to the case of the interval detection unit 32, or may be used for detection of whether or not another object is present around the target object, detection of an action of another object, or the like.

<Description of Recording Process>

Next, operation of the recording device 11 and the server 12 depicted in FIG. 10 will be described.

Figure 11:
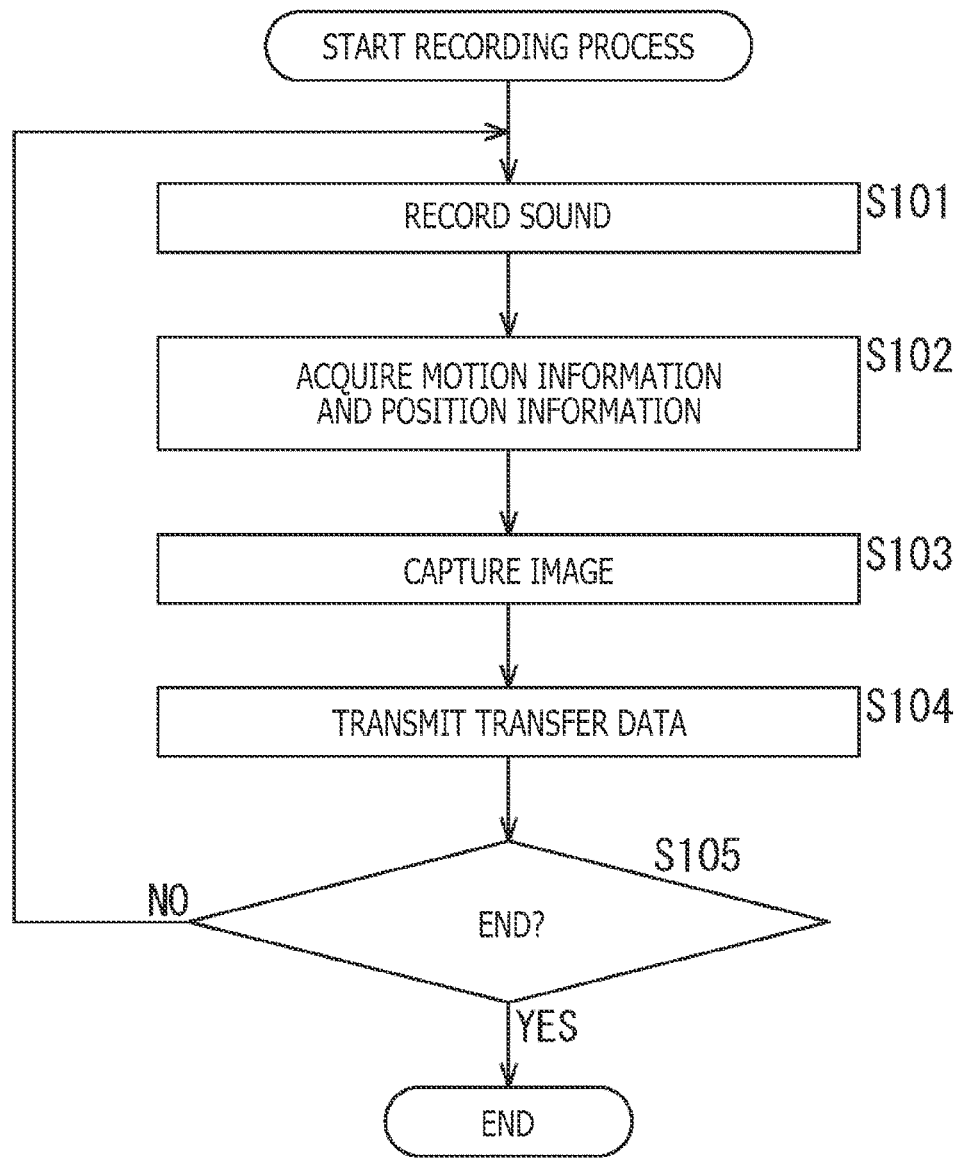
FIG. 11 is a flowchart explaining a recording process.

The recording process performed by the recording device 11 will first be described with reference to a flowchart in FIG. 11.

Figure 6:
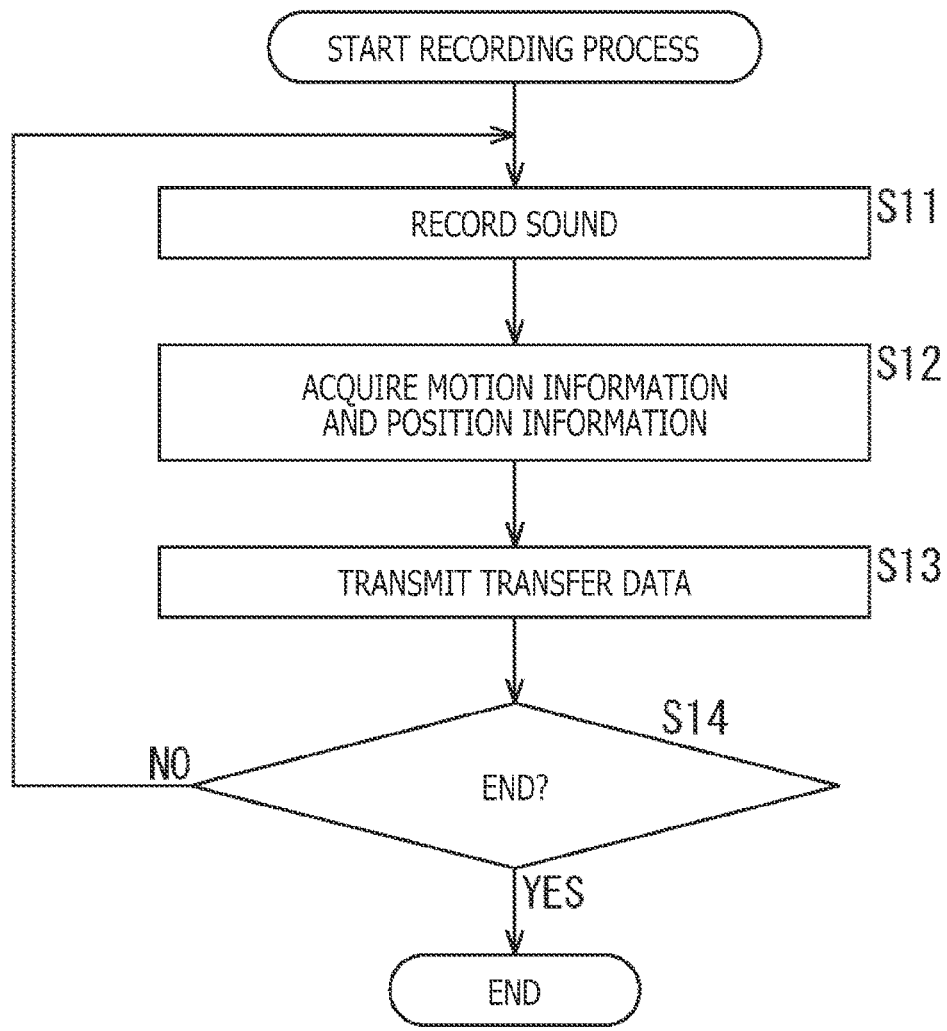
FIG. 6 is a flowchart explaining a recording process.

Note that processes in step S101 and step S102 are similar to the processes in step S11 and step S12 in FIG. 6 and are thus not repetitively described.

In step S103, the imaging unit 101 captures an image of an object, i.e., surroundings of the recording device 11, as a subject and supplies image information thus obtained to the transfer unit 25.

The transfer unit 25 generates transfer data containing the image information supplied from the imaging unit 101 and a recording signal, motion information, and position information supplied from the recording unit 24.

After the transfer data is generated, processes in step S104 and step S105 are performed. Thereafter, the recording process ends. These processes are similar to the processes in step S13 and step S14 in FIG. 6 and are thus not repetitively described.

In the manner described above, the recording device 11 captures the image of the surrounding subject, generates the transfer data containing the obtained image information, and transmits the generated transfer data to the server 12. In such a manner, the server 12 is allowed to obtain a higher-quality target sound using not only the motion information and the position information but also the image information.

<Description of Data Generation Process>

Figure 12:
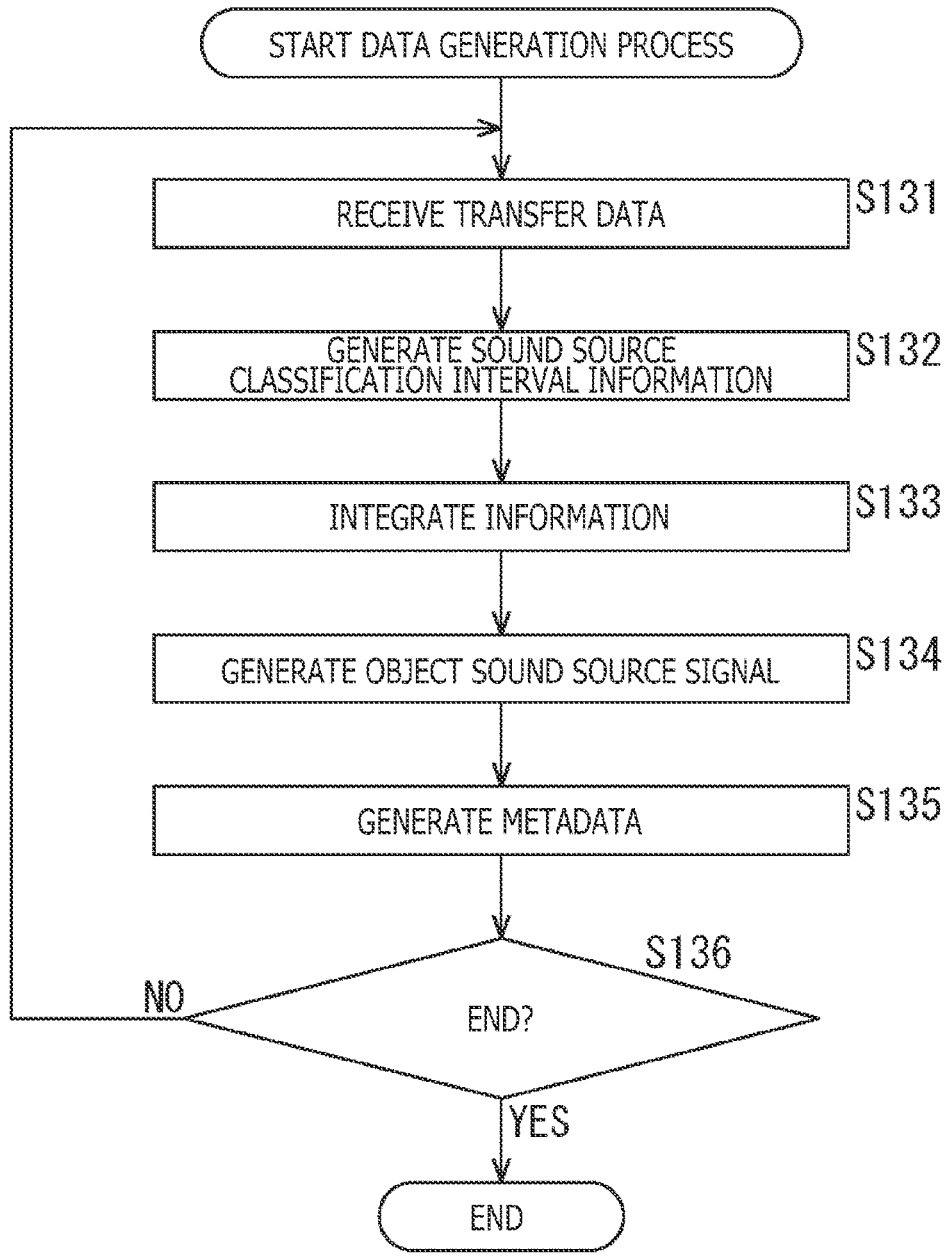
FIG. 12 is a flowchart explaining a data generation process.

The data generation process performed by the server 12 depicted in FIG. 10 will next be described with reference to a flowchart in FIG. 12.

Note that a process in step S131 is similar to the process in step S71 in FIG. 9 and is thus not repetitively described. However, the reception unit 31 in step S131 also extracts image information from transfer data and supplies the image information to the interval detection unit 32 and the integration unit 71.

In step S132, the interval detection unit 32 generates sound source classification interval information on the basis of a recording signal, motion information, and the image information that are supplied from the reception unit 31, and supplies the generated sound source classification interval information to the integration unit 71.

Note that a process similar to the process in step S72 in FIG. 9 is performed in step S132. In this case, the image information herein is used for detection of an action of the target object or the like, to generate the sound source classification interval information.

In step S133, the integration unit 71 integrates pieces of information supplied from the interval detection unit 32 and the reception unit 31, to generate final sound source classification interval information.

In step S133, a process similar to the process in step S73 in FIG. 9 is performed. However, a position information comparison process, a time interval integration process, and an interval smoothing process are performed herein using not only the sound source classification interval information, the recording signal, the motion information, and the position information, but also the image information. In other words, the image information is used for selection of a reference object or generation of relative orientation information, for example.

After the final sound source classification interval information is obtained in such a manner, processes in step S134 to step S136 are performed. Thereafter, the data generation process ends. These processes are similar to the processes in step S74 to step S76 in FIG. 9 and are thus not repetitively described.

In the manner described above, the server 12 receives transfer data from the multiple recording devices 11, generates object sound source data using these pieces of transfer data, and outputs the generated object sound source data.

At this time, a higher-quality target sound can be obtained by generating the sound source classification interval information associated with the target object using the image information as well.

Fourth Embodiment

<Configuration Example of Recording System>

In the recording system depicted in FIG. 10, the example in which image information obtained from viewpoints corresponding to positions of respective objects is used has been described. However, image information associated with an image of an entire target space, as a subject, where objects to which the respective recording devices 11 are attached, i.e., all objects, are present may be used.

Figure 13:
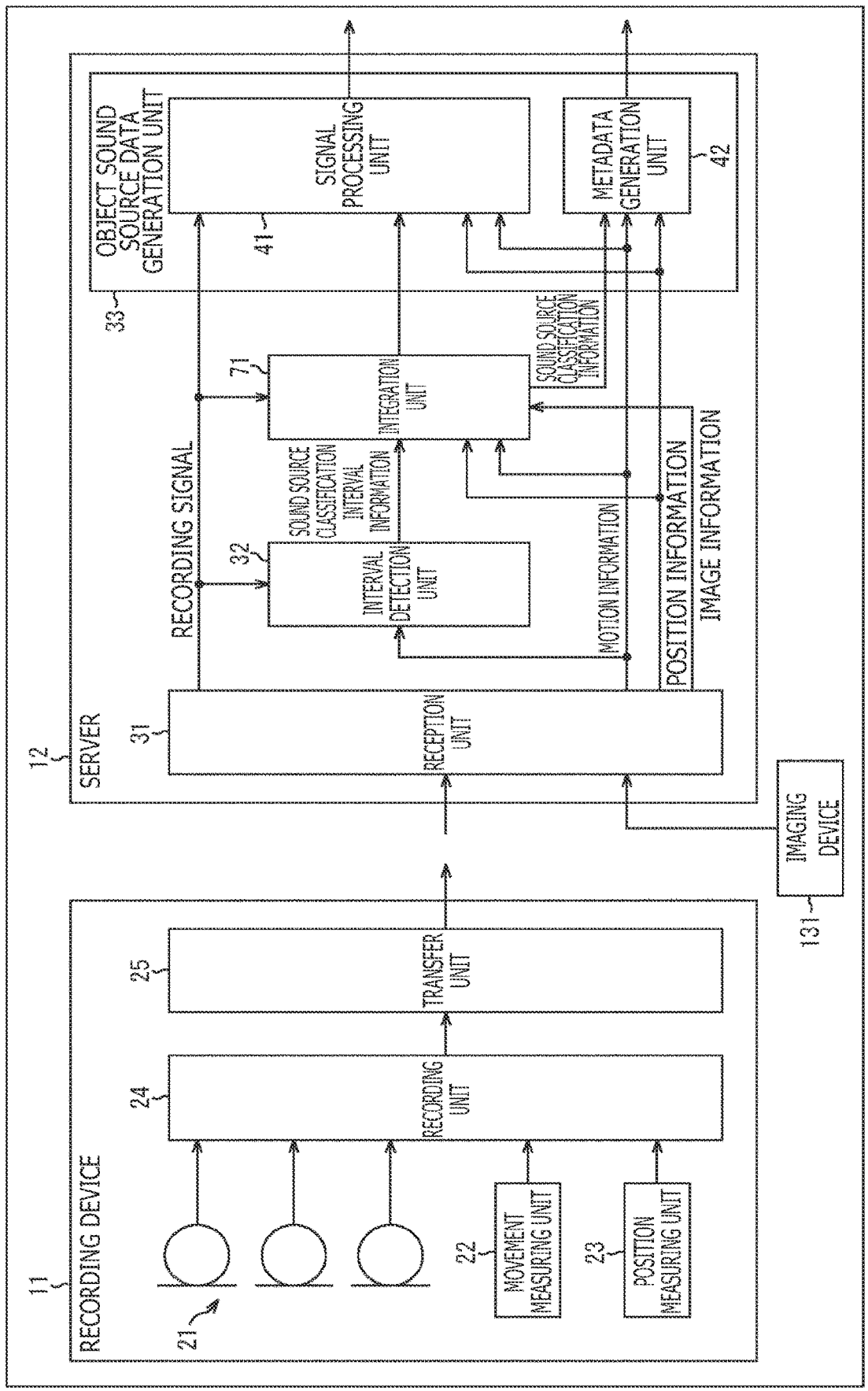
FIG. 13 is a diagram depicting a configuration example of a recording system.

In such a case, the recording system is configured as depicted in FIG. 13, for example. Note that parts in FIG. 13 corresponding to the parts in FIG. 8 are given identical reference symbols, and description of these parts is omitted where appropriate.

The recording system depicted in FIG. 13 includes the recording device 11, an imaging device 131, and the server 12. The recording device 11 and the server 12 each has the same configuration as the corresponding configuration depicted in FIG. 8.

For example, the imaging device 131 includes a camera or the like and is configured to capture an image of an entire target space, as a subject, where objects to which the recording devices 11 are attached are present, and transmits image information thus obtained to the server 12. Note that the imaging device 131 continues imaging while the recording devices 11 are recording, i.e., the microphones 21 are collecting sounds.

In addition, the reception unit 31 of the server 12 receives not only transfer data transmitted from the recording devices 11, but also image information transmitted from the imaging device 131.

The reception unit 31 supplies the received image information to the integration unit 71. In addition, the integration unit 71 generates final sound source classification interval information on the basis of a recording signal, motion information, position information, and the image information that are supplied from the reception unit 31 and on the basis of the sound source classification interval information supplied from the interval detection unit 32.

In this example, the integration unit 71 uses the image information for detecting actions of the respective objects.

For example, the integration unit 71 is supplied with pieces of the position information associated with the respective objects and can thus specify, on the basis of these pieces of position information, which of the objects corresponds to each of the objects in an image obtained by performing image recognition or the like on the image information. In addition, the integration unit 71 can specify which action is performed by each of the objects, by performing image recognition or the like on the image information. In other words, the integration unit 71 can specify which sound of the object sound source is emitted from the corresponding object at each point of time.

The integration unit 71 generates final sound source classification interval information by using the actions of the respective objects specified in the above manner for a time interval integration process and the like. In addition, for example, the image information may be input to an identifier such as DNN for a calculation process executed in the time interval integration process.

Note that the interval detection unit 32 may also use the image information for detecting the actions of the respective objects.

<Description of Data Generation Process>

In a case where the recording system has the configuration depicted in FIG. 13, each of the recording devices 11 performs the recording process described with reference to FIG. 6 and transmits transfer data to the server 12. In addition, the imaging device 131 transmits image information to the server 12.

Figure 14:
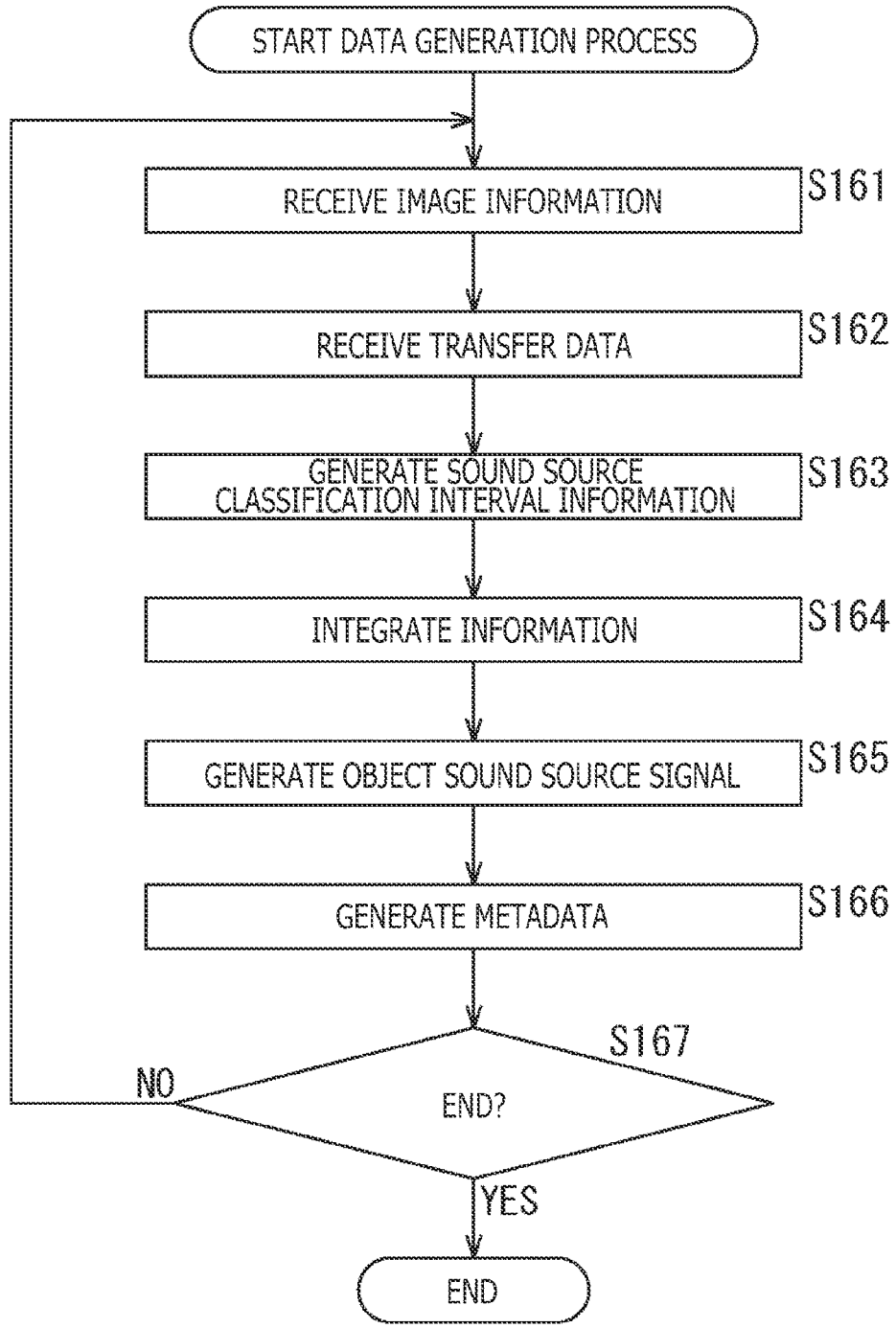
FIG. 14 is a flowchart explaining a data generation process.

Thereafter, the server 12 performs a data generation process depicted in FIG. 14. The data generation process performed by the server 12 depicted in FIG. 13 will hereinafter be described with reference to a flowchart in FIG. 14.

In step S161, the reception unit 31 receives the image information transmitted from the imaging device 131 and supplies the image information to the integration unit 71.

In addition, the transfer data is transmitted from the recording devices 11 to the server 12, and the server 12 performs processes in steps S162 and S163 to generate sound source classification interval information.

Note that the processes in step S162 and step S163 are similar to the processes in step S71 and step S72 in FIG. 9 and are thus not repetitively described.

In step S164, the integration unit 71 performs information integration.

Specifically, the integration unit 71 performs a position information comparison process, a time interval integration process, and an interval smoothing process on the basis of the image information, a recording signal, motion information, and position information that are supplied from the reception unit 31 and on the basis of the sound source classification interval information supplied from the interval detection unit 32, to obtain final sound source classification interval information. At this time, the image information is used for selection of a reference object, for example.

The integration unit 71 supplies the obtained final sound source classification interval information to the signal processing unit 41, generates sound source classification information on the basis of the final sound source classification interval information, and supplies the generated sound classification information to the metadata generation unit 42.

After the sound source classification interval information is obtained in such a manner, processes in step S165 to step S167 are performed, and the data generation process ends. These processes are similar to the processes in step S74 to step S76 in FIG. 9 and are thus not repetitively described.

In the manner described above, the server 12 receives the transfer data from the multiple recording devices 11 and the image information from the imaging device 131, generates object sound source data using these pieces of transfer data and the image information, and outputs the generated object sound source data. In such a manner, a higher-quality target sound can be obtained by using the image information as well.

Fifth Embodiment

<Configuration Example of Recording System>

Note that the example in which the sound source classification interval information is generated using the server 12 has been described above. However, the sound source classification interval information may be generated using the recording device 11.

Figure 15:
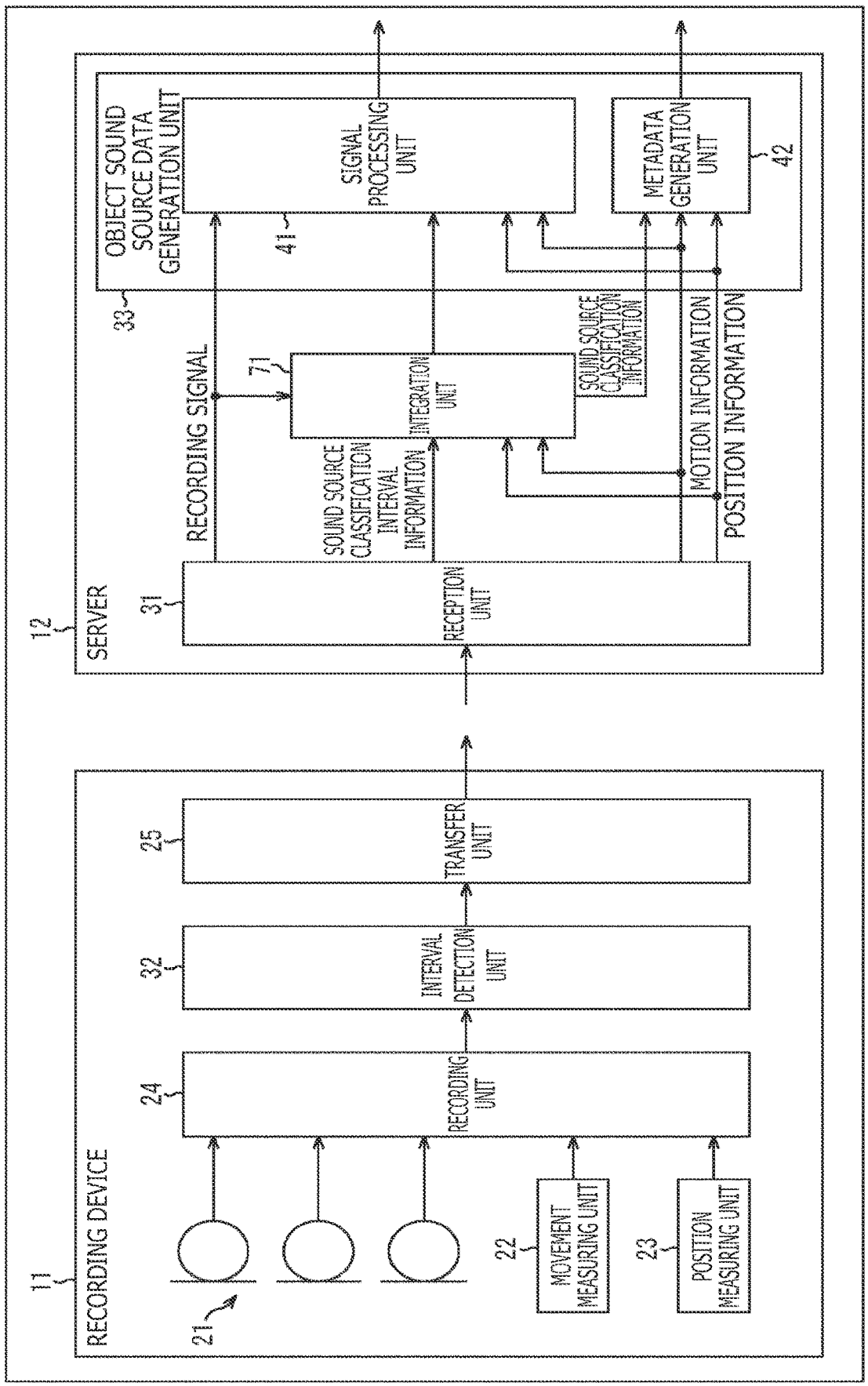
FIG. 15 is a diagram depicting a configuration example of a recording system.

In such a case, the interval detection unit 32 described above is provided on the recording device 11 side as depicted in FIG. 15, for example. Note that parts in FIG. 15 corresponding to the parts in FIG. 8 are given identical reference symbols, and description of these parts is omitted where appropriate.

The recording system depicted in FIG. 15 includes the recording device 11 and the server 12.

In addition, the recording device 11 includes the microphone 21, the movement measuring unit 22, the position measuring unit 23, the recording unit 24, the interval detection unit 32, and the transfer unit 25.

The configuration of the recording device 11 depicted in FIG. 15 is different from the configuration of the recording device 11 depicted in FIG. 8 in that the interval detection unit 32 is provided, and is the same as the configuration of the recording device 11 depicted in FIG. 8 in other points.

The interval detection unit 32 generates sound source classification interval information on the basis of a recording signal and motion information that are supplied from the recording unit 24, and supplies, to the transfer unit 25, the sound source classification interval information thus obtained and a recording signal, motion information, and position information that are supplied from the recording unit 24.

The transfer unit 25 generates transfer data containing the recording signal, the motion information, the position information, and the sound source classification interval information that are supplied from the interval detection unit 32, and transmits the transfer data to the server 12.

Meanwhile, the server 12 includes the reception unit 31, the integration unit 71, and the object sound source data generation unit 33. The object sound source data generation unit 33 includes the signal processing unit 41 and the metadata generation unit 42.

The configuration of the server 12 herein is different from the server 12 depicted in FIG. 8 in that the interval detection unit 32 is not provided, and is the same as the configuration of the server 12 depicted in FIG. 8 in the other points.

In the example depicted in FIG. 15, the reception unit 31 of the server 12 extracts the recording signal, the motion information, the position information, and the sound source classification interval information from the received transfer data.

Thereafter, the reception unit 31 supplies the recording signal, the motion information, the position information, and the sound source classification interval information to the integration unit 71, supplies the recording signal, the motion information, and the position information to the signal processing unit 41, and supplies the motion information and the position information to the metadata generation unit 42.

In addition, the integration unit 71 generates final sound source classification interval information on the basis of the recording signal, the motion information, the position information, and the sound source classification interval information that are supplied from the reception unit 31, and supplies the final sound source classification interval information to the signal processing unit 41. In addition, the integration unit 71 also generates sound source classification information and supplies the sound source classification information to the metadata generation unit 42.

Reduction of a processing load imposed on the server 12 and acquisition of a high-quality target sound are achievable by generating the sound source classification interval information on the recording device 11 side in the manner described above. Note that the sound source classification interval information may be generated on the recording device 11 side in the recording system depicted in FIG. 10 or FIG. 13.

According to the present technology, as described above, differentiation between a sound of a target object contained in the recording signal and a sound of another object can be made using motion information, position information, and image information, in an environment where multiple mobile bodies (objects) are present and each emit a sound.

In such a manner, detection of a time interval containing a sound for each object sound source classification, execution of signal processing for each object sound source classification, behavior recognition of an action state of each object, and the like are achievable.

For example, as a time interval of a sound for each object sound source classification, a time interval of a walking sound, a running sound, a ball kicking sound of succor, a hitting sound or a catching sound of baseball, applause, a rustle of clothes, or a step sound of dancing, or the like is accurately detectable.

Generally, an action sound is not acquirable only from a sensor signal. In addition, information associated with an orientation or speaker individuality (individuality) of a voice is required to make distinction between action sounds of the same type generated from a target object and from another object and contained in a recording signal from a microphone.

Concerning this point, the present technology is capable of accurately detecting a time interval of a sound of an object sound source and obtaining a high-quality object sound source signal, in comparison with a case of use of only a sensor signal or only a recording signal.

Specifically, suppose that a target object and another object are located close to each other in a case of detection of a time interval of an action sound only from a recording signal.

In such a case, an orientation of a sound source is estimated using a multimicrophone, and the estimated orientation is used for distinguishment between an action sound of the target object and an action sound of the other object, similarly to the case of a voice.

However, in a case where a time interval of an action sound such as a walking sound is short or where an orientation of a sound source varies with time, for example, it is often difficult to identify which object is emitting the action sound.

On the other hand, motion information contains only bodily movement information based on an action of the target object and does not contain information associated with an action of the other object.

Accordingly, the time interval of the action sound of the target object is accurately detectable by combining the recording signal and the motion information for detection of the time interval of the action sound, as in the present technology.

For example, in a case of detection of a time interval of a walking sound as the action sound, a condition of a ground surface or shoes considerably influences the detection accuracy when only a recording signal is used. However, the time interval of the walking sound is accurately detectable by using motion information in combination with the recording signal.

In addition, the present technology is capable of detecting a time interval containing a significant sound of an object sound source in audio reproduction in recording content such as a sport and a play, and preventing transmission of an object sound source signal in an unnecessary time interval.

In this manner, the present technology achieves reduction of an information volume of information associated with content to be transferred or recorded, particularly an information volume of an object sound source signal, and a processing volume in the following stage.

Further, according to the present technology, an object sound source signal is generated for each object or for each object sound source of an object. Accordingly, an audio image localization can be set for each object sound source in the following stage, and therefore, more accurate audio image localization is achievable.

Moreover, according to the present technology, an object sound source signal is generated for each object sound source. Accordingly, only sounds of some of object sound source classifications are selectively reproducible, such as a case of reproduction of only an action sound without a voice in sport broadcasting. In this manner, functionality during reproduction can improve.

Besides, according to the present technology, in a case where real-time processing is performed by the server 12 during recording of content such as a sport game, for example, in a case where instant replay is used in a current situation, information that is associated with action conditions of respective players and that is effective additional information can be provided.

Specifically, as information associated with an action condition of a player, information indicating a time interval of a predetermined action sound or a time interval of a voice can be provided on the basis of sound source classification interval information, for example.

Further, the present technology is applicable not only to recording of content or the like but also to various situations such as a situation where multiple vehicles are present on a road, a situation where multiple flying bodies such as drones are flying, and a situation where multiple robots are present.

For example, the recording device 11 may be provided on a vehicle, and a recording signal, motion information, and the like obtained by the recording device 11 and information obtained by a drive recorder equipped on the vehicle may be used for determination of a contact with another vehicle.

<Configuration Example of Computer>

Meanwhile, a series of processes described above may be executed either by hardware or by software. In a case where the series of processes are executed by software, a program constituting the software is installed in a computer. Examples of the computer herein include a computer incorporated in dedicated hardware and a computer capable of executing various functions under various programs installed in the computer, such as a general-purpose personal computer.

Figure 16:
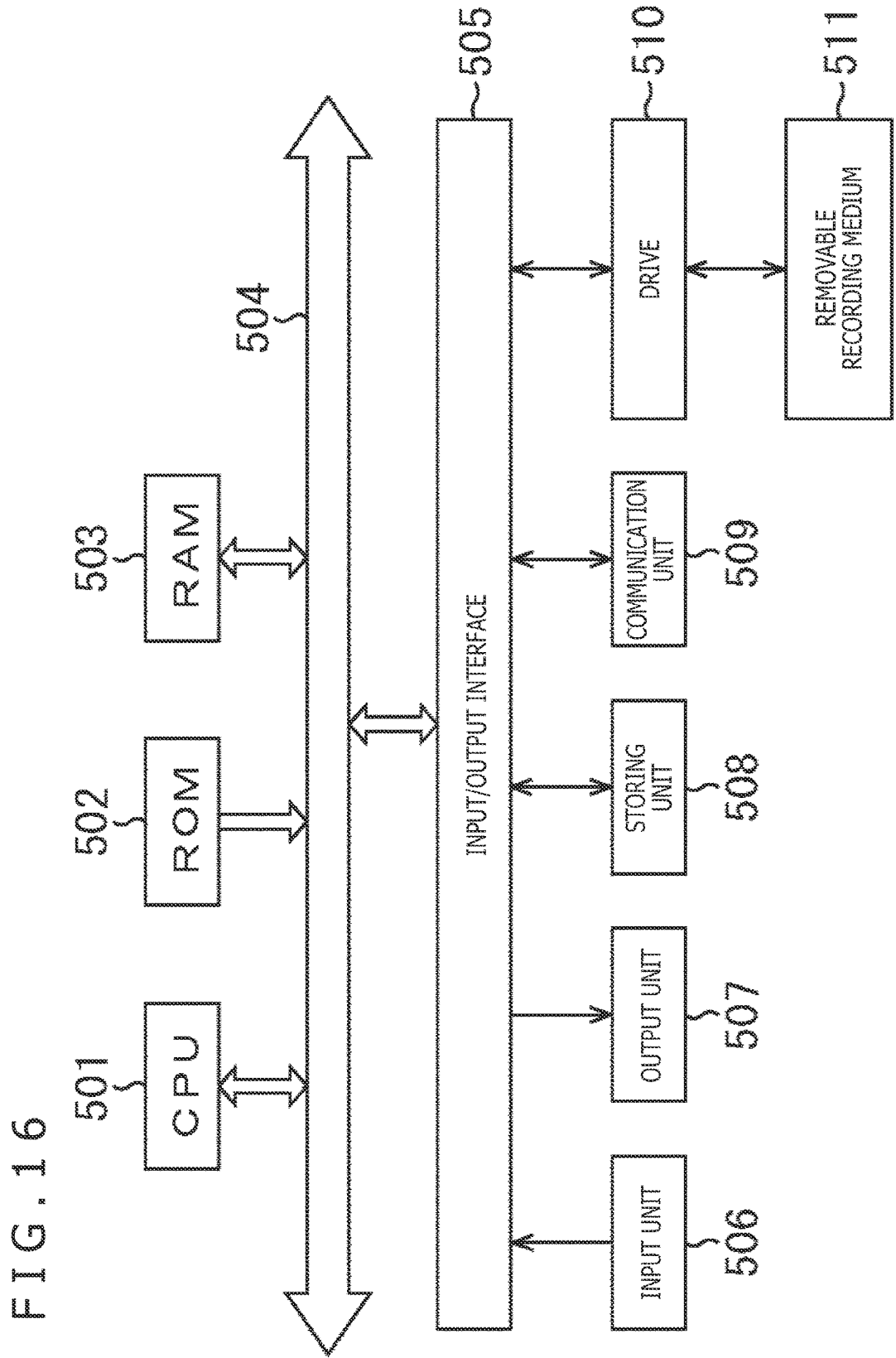
FIG. 16 is a diagram depicting a configuration example of a computer.

FIG. 16 is a block diagram depicting a hardware configuration example of a computer which executes the series of processes described above under a program.

A computer includes a CPU (Central Processing Unit) 501, a ROM (Read Only Memory) 502, and a RAM (Random Access Memory) 503 connected to each other via a bus 504.

An input/output interface 505 is further connected to the bus 504. An input unit 506, an output unit 507, a storing unit 508, a communication unit 509, and a drive 510 are connected to the input/output interface 505.

The input unit 506 includes a keyboard, a mouse, a microphone, an imaging element, and the like. The output unit 507 includes a display, a speaker, and the like. The storing unit 508 includes a hard disk, a non-volatile memory, and the like. The communication unit 509 includes a network interface and the like. The drive 510 drives a removable recording medium 511 such as a magnetic disk, an optical disk, a magneto-optical disk, and a semiconductor memory.

In the computer configured as described above, for example, the CPU 501 loads a program recorded in the storing unit 508 into the RAM 503 via the input/output interface 505 and the bus 504 and executes the loaded program to perform the series of processes described above.

For example, the program executed by the computer (CPU 501) is allowed to be recorded in the removable recording medium 511 as a package medium or the like and be provided in this form. In addition, the program is allowed to be provided via a wired or wireless transfer medium such as a local area network, the Internet, and digital satellite broadcasting.

The program in the computer is allowed to be installed in the storing unit 508 via the input/output interface 505 from the removable recording medium 511 attached to the drive 510. In addition, the program is allowed to be received by the communication unit 509 via a wired or wireless transfer medium and be installed in the storing unit 508. Otherwise, the program is allowed to be installed in the ROM 502 or the storing unit 508 beforehand.

Note that the program executed by the computer may be a program where processes are performed in an order described in the present description in time series, or may be a program where processes are performed in parallel or at necessary timing such as an occasion of a call.

In addition, embodiments according to the present technology are not limited to the embodiments described above and may be modified in various manners without departing from the subject matters of the present technology.

For example, the present technology is allowed to have a configuration of cloud computing where one function is shared and processed by multiple apparatuses in cooperation with each other via a network.

Further, the respective steps described in the abovementioned flowcharts are allowed to be executed by one apparatus or be shared and executed by multiple apparatuses.

Besides, in a case where one step includes multiple processes, the multiple processes included in the one step are allowed to be executed by one apparatus or be shared and executed by multiple apparatuses.

In addition, the present technology can also have the following configurations.

(1)

A signal processing apparatus including: an interval detection unit configured to detect a time interval containing a sound that is emitted from a mobile body and that is included in a recording signal obtained by collecting sounds around the mobile body in a state where another mobile body is present around the mobile body, the time interval being detected on the basis of the recording signal and a sensor signal output from a sensor attached to the mobile body.

(2)

The signal processing apparatus according to (1), further including:

a data generation unit configured to generate an audio signal of a voice or an action sound of the mobile body from the recording signal on the basis of a detection result of the time interval.

(3)

The signal processing apparatus according to (2), in which the data generation unit outputs object sound source data that contains the audio signal and position information indicating a position of the mobile body.

(4)

The signal processing apparatus according to (2) or (3), in which the data generation unit outputs object sound source data that contains the audio signal and information indicating a direction of the mobile body.

(5)

The signal processing apparatus according to any one of (2) to (4), in which the data generation unit outputs object sound source data that contains the audio signal and sound source classification information indicating a sound classification based on the audio signal.

(6)

The signal processing apparatus according to any one of (1) to (5), in which the interval detection unit detects the time interval of the sound emitted from the mobile body, on the basis of the recording signal and the sensor signal of the mobile body and on the basis of the recording signal or the sensor signal of the other mobile body.

(7)

The signal processing apparatus according to (6), in which the interval detection unit detects the time interval of the sound emitted from the mobile body, on the basis of a distance from the mobile body to the other mobile body.

(8)

The signal processing apparatus according to (6) or (7), in which the interval detection unit detects the time interval of the sound emitted from the mobile body, on the basis of a direction of the mobile body and a position of the other mobile body.

(9)

The signal processing apparatus according to any one of (6) to (8), in which the interval detection unit obtains a final detection result of the time interval on the basis of a detection result of the time interval, by connecting multiple time intervals that are included in the recording signal and that contain a sound of an identical classification, the time intervals being continuously aligned and including the time interval shorter than a predetermined time width.

(10)

The signal processing apparatus according to (9), in which the interval detection unit connects the multiple time intervals by performing a smoothing process on the detection result of the time interval.

(11)

The signal processing apparatus according to any one of (2) to (5), in which the data generation unit generates the audio signal by performing sound source separation on the recording signal on the basis of the detection result of the time interval.

(12)

The signal processing apparatus according to any one of (2) to (5), in which the data generation unit generates the final audio signal by replacing a part of the recording signal or a part of the audio signal with another signal on the basis of the detection result of the time interval.

(13)

A signal processing method including:
by a signal processing apparatus,
detecting a time interval containing a sound that is emitted from a mobile body and that is included in a recording signal obtained by collecting sounds around the mobile body in a state where another mobile body is present around the mobile body, the time interval being detected on the basis of the recording signal and a sensor signal output from a sensor attached to the mobile body.

(14)

A program causing a computer to execute a process including:
a step of detecting a time interval containing a sound that is emitted from a mobile body and that is included in a recording signal obtained by collecting sounds around the mobile body in a state where another mobile body is present around the mobile body, the time interval being detected on the basis of the recording signal and a sensor signal output from a sensor attached to the mobile body.

REFERENCE SIGNS LIST

11: Recording device
12: Server
21: Microphone
24: Recording unit
25: Transfer unit
31: Reception unit
32: Interval detection unit
33: Object sound source data generation unit
41: Signal processing unit
42: Metadata generation unit
71: Integration unit

The invention claimed is:

1. A signal processing apparatus, comprising:
an interval detection unit configured to detect a time interval containing a sound that is emitted from a first mobile body, wherein
the sound included in a first recording signal,
the first recording signal is obtained based on collection of sounds around the first mobile body in a state in which a second mobile body is present around the first mobile body, and
the time interval is detected based on:
the first recording signal and a first sensor signal output from a sensor which is attached to the first mobile body,
a second recording signal associated with the second mobile body and a second sensor signal associated with the second mobile body, and
a distance from the first mobile body to the second mobile body.

2. The signal processing apparatus according to claim 1, further comprising a data generation unit configured to generate a first audio signal, of one of a voice or an action sound of the first mobile body, from the first recording signal based on a detection result of the detection of the time interval.

3. The signal processing apparatus according to claim 2, wherein the data generation unit is further configured to output object sound source data that contains the first audio signal and position information indicating a position of the first mobile body.

4. The signal processing apparatus according to claim 2, wherein the data generation unit is further configured to output object sound source data that contains the first audio signal and information indicating a direction of the first mobile body.

5. The signal processing apparatus according to claim 2, wherein
the interval detection unit is further configured to generate sound source classification information based on the first audio signal,
the sound source classification information includes a classification of the sound in the first recording signal, and a classification of the first mobile body, and the data generation unit is further configured to output object sound source data that contains the first audio signal and the sound source classification information.

6. The signal processing apparatus according to claim 2, wherein the data generation unit is further configured to generate the first audio signal based on sound source separation operation on the first recording signal and the detection result of the time interval.

7. The signal processing apparatus according to claim 2, wherein
the data generation unit is further configured to generate a final audio signal by replacement of one of a part of the first recording signal or a part of the first audio signal with a second audio signal based on the detection result of the time interval, and
the second audio signal is different from the first audio signal.

8. The signal processing apparatus according to claim 1, wherein the interval detection unit is further configured to:
connect a plurality of time intervals included in the first recording signal, wherein
each interval of the plurality of time intervals contains the sound,
the sound in each interval of the plurality of time intervals has identical classification, and
the plurality of time intervals include the time interval; and
obtain a final time interval based on the connection of the plurality of time intervals,
wherein the plurality of time intervals are being continuously aligned, and
each interval of the plurality of time intervals is shorter than a specific time width.

9. The signal processing apparatus according to claim 8, wherein the interval detection unit is further configured to connect the plurality of time intervals based on a smoothing process on a detection result of the time interval.

10. The signal processing apparatus according to claim 1, wherein the interval detection unit is further configured to detect the time interval of the sound emitted from the first mobile body, based on a direction of the first mobile body and a position of the second mobile body.

11. A signal processing method, comprising:
by a signal processing apparatus,
detecting a time interval containing a sound that is emitted from a first mobile body, wherein
the sound is included in a first recording signal,
the first recording signal is obtained by collecting sounds around the first mobile body in a state in which a second mobile body is present around the first mobile body, and
the time interval is detected based on;
the first recording signal and a first sensor signal output from a sensor which is attached to the first mobile body,
a second recording signal associated with the second mobile body and a second sensor signal associated with the second mobile body, and
a distance from the first mobile body to the second mobile body.

12. A non-transitory computer-readable medium having stored thereon, computer-executable instructions which, when executed by a computer, cause the computer to execute operations, the operations comprising:
detecting a time interval containing a sound that is emitted from a first mobile body, wherein
the sound is included in a first recording signal,
the first recording signal is obtained by collecting sounds around the first mobile body in a state in which a second mobile body is present around the first mobile body, and
the time interval is detected based on:
the first recording signal and a first sensor signal output from a sensor which is attached to the first mobile body,
a second recording signal associated with the second mobile body and a second sensor signal associated with the second mobile body, and
a distance from the first mobile body to the second mobile body.

* * * * *